US008165295B2

(12) United States Patent
Ito et al.

(10) Patent No.: US 8,165,295 B2
(45) Date of Patent: Apr. 24, 2012

(54) DATA TRANSMISSION METHOD

(75) Inventors: Yujiro Ito, Kanagawa (JP); Tsutomu Shimosato, Tokyo (JP)

(73) Assignee: Sony Corporation, Tokyo (JP)

( * ) Notice: Subject to any disclaimer, the term of this patent is extended or adjusted under 35 U.S.C. 154(b) by 1453 days.

(21) Appl. No.: 10/552,185

(22) PCT Filed: Apr. 6, 2004

(86) PCT No.: PCT/JP2004/004966
§ 371 (c)(1),
(2), (4) Date: Oct. 6, 2005

(87) PCT Pub. No.: WO2004/091133
PCT Pub. Date: Oct. 21, 2004

(65) Prior Publication Data
US 2007/0124645 A1    May 31, 2007

(30) Foreign Application Priority Data
Apr. 8, 2003   (JP) .............................. P2003-103600

(51) Int. Cl.
H04L 9/00   (2006.01)
(52) U.S. Cl. ........................................ 380/255; 380/239
(58) Field of Classification Search .............. 705/50–41, 705/57, 62; 726/2, 4–7, 13, 18–19, 26–27, 726/30, 32; 713/160, 165, 189; 380/1, 200–203, 380/208, 237, 239, 255, 37, 28–30
See application file for complete search history.

(56) References Cited

U.S. PATENT DOCUMENTS

| 5,161,210 | A  | * | 11/1992 | Druyvesteyn et al. ........ 704/200 |
| 5,797,118 | A  | * | 8/1998  | Saito ............................. 704/222 |
| 6,834,110 | B1 | * | 12/2004 | Marconcini et al. .......... 380/239 |
| 7,076,153 | B2 | * | 7/2006  | Ando et al. .................... 386/95 |
| 7,146,501 | B2 | * | 12/2006 | Tanaka .......................... 713/176 |

FOREIGN PATENT DOCUMENTS

| JP | 4 179344    | 6/1992  |
| JP | 4-179344    | 6/1992  |
| JP | 7 67140     | 3/1995  |
| JP | 7-67140     | 3/1995  |
| JP | 10-108217   | 4/1998  |
| JP | 10 108217   | 4/1998  |
| WO | WO 03-096608 | 11/2003 |

* cited by examiner

*Primary Examiner* — Kim Vu
*Assistant Examiner* — Leynna T Truvan
(74) *Attorney, Agent, or Firm* — Frommer Lawrence & Haug LLP; William S. Frommer; Thomas F. Presson

(57) ABSTRACT

Encrypted auxiliary information data DYAE/DCAE including no inhibited codes is generated based on auxiliary information data DYA/DCA including no inhibited codes, in an auxiliary data packet having an auxiliary data flag ADF formed of a first combination of a plurality of inhibited codes, the auxiliary data flag ADF is replaced with an auxiliary data flag EADF formed of a second combination of the inhibited codes, the second combination being different from the first combination, to form an encrypted auxiliary data packet having the auxiliary data flag EADF and including the encrypted auxiliary information data DYAE/DCAE, and the encrypted auxiliary data packet is transmitted.

24 Claims, 12 Drawing Sheets

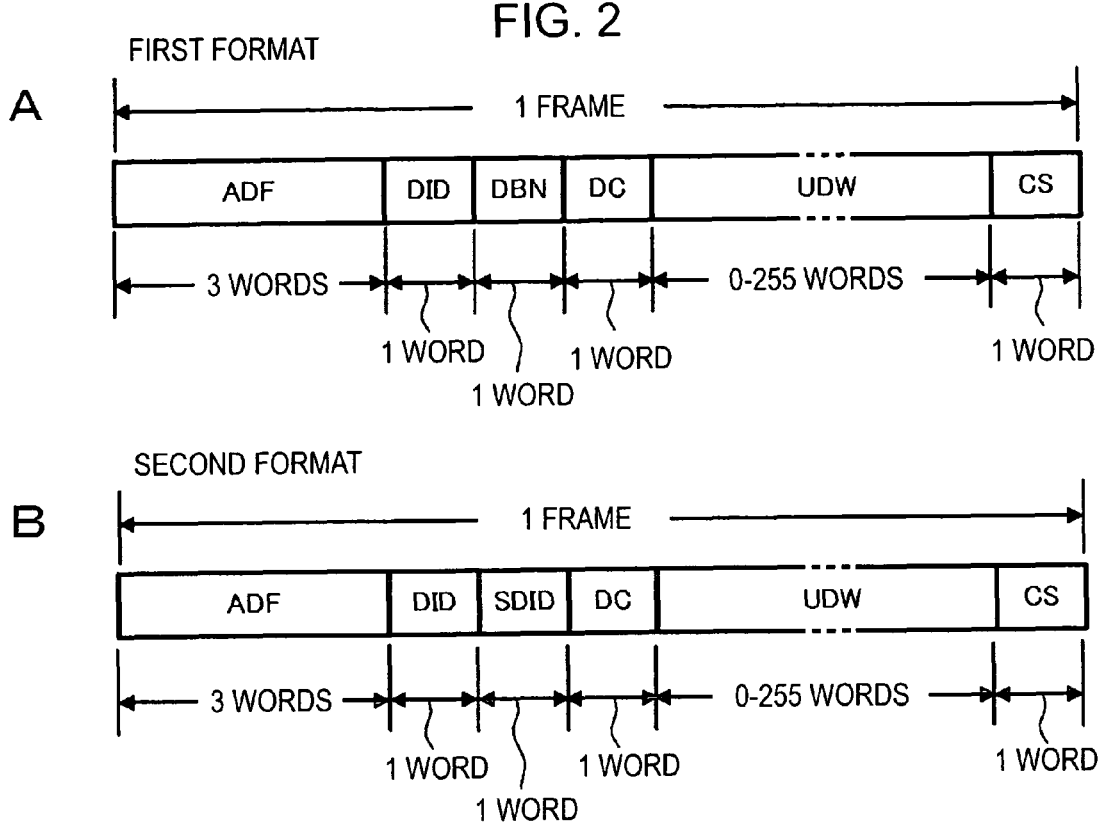
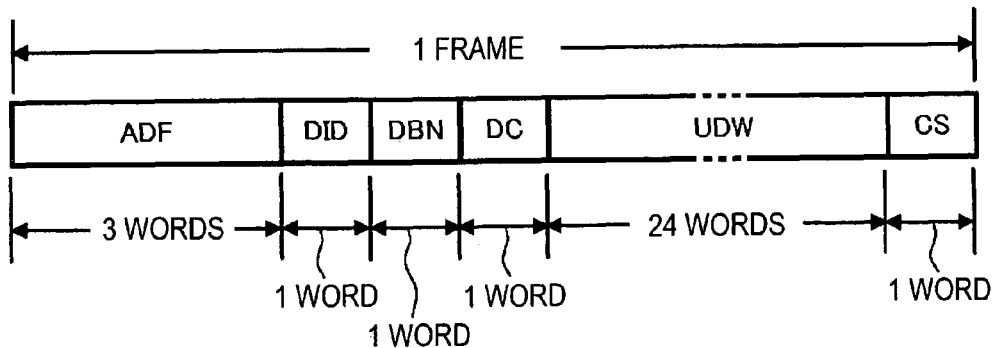

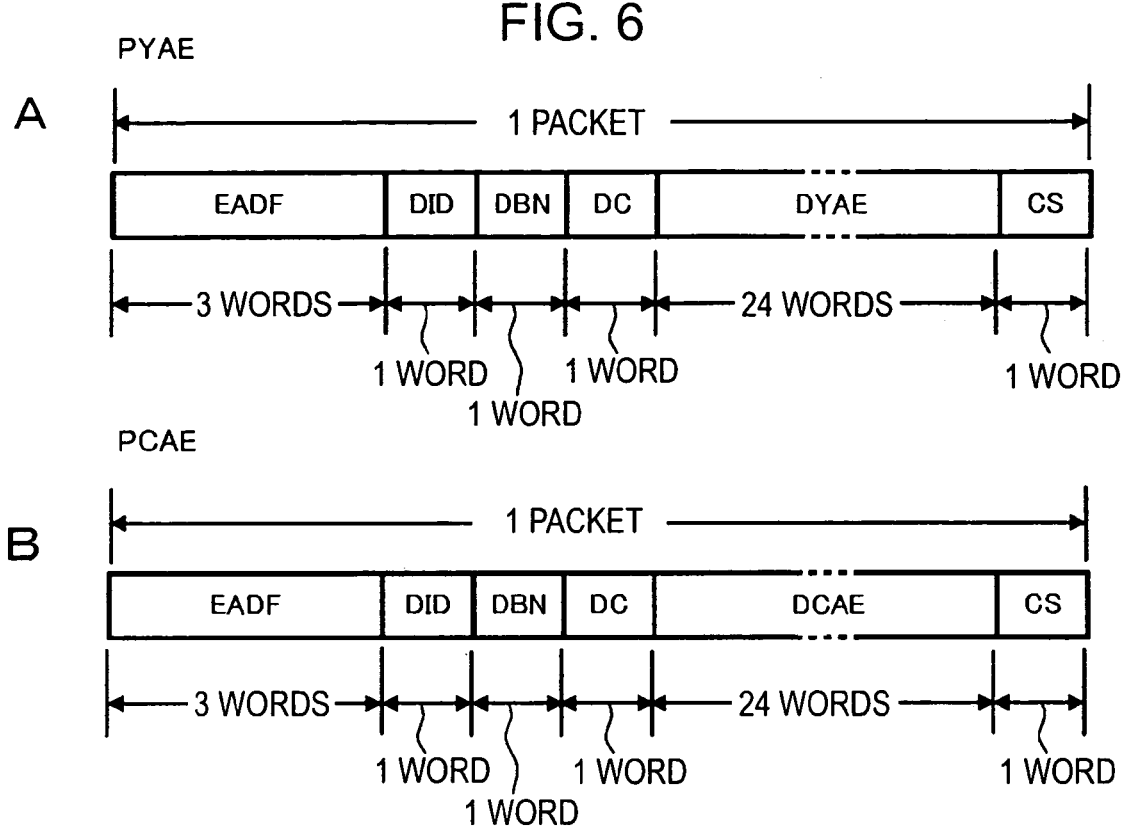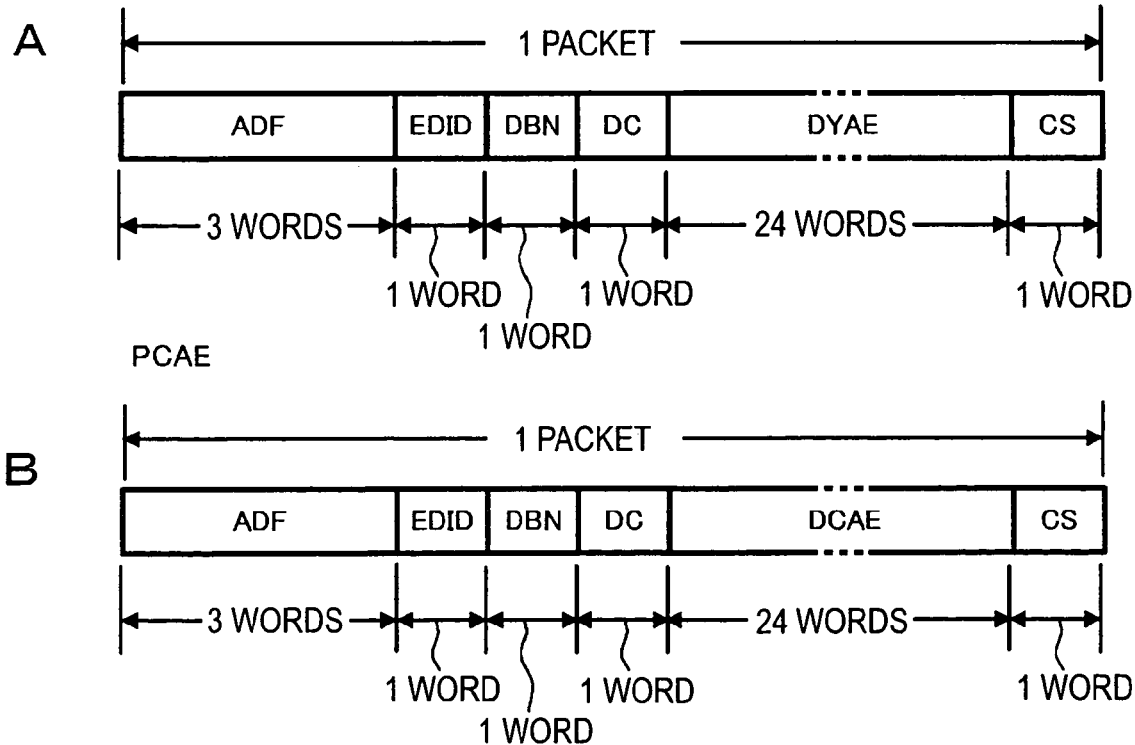

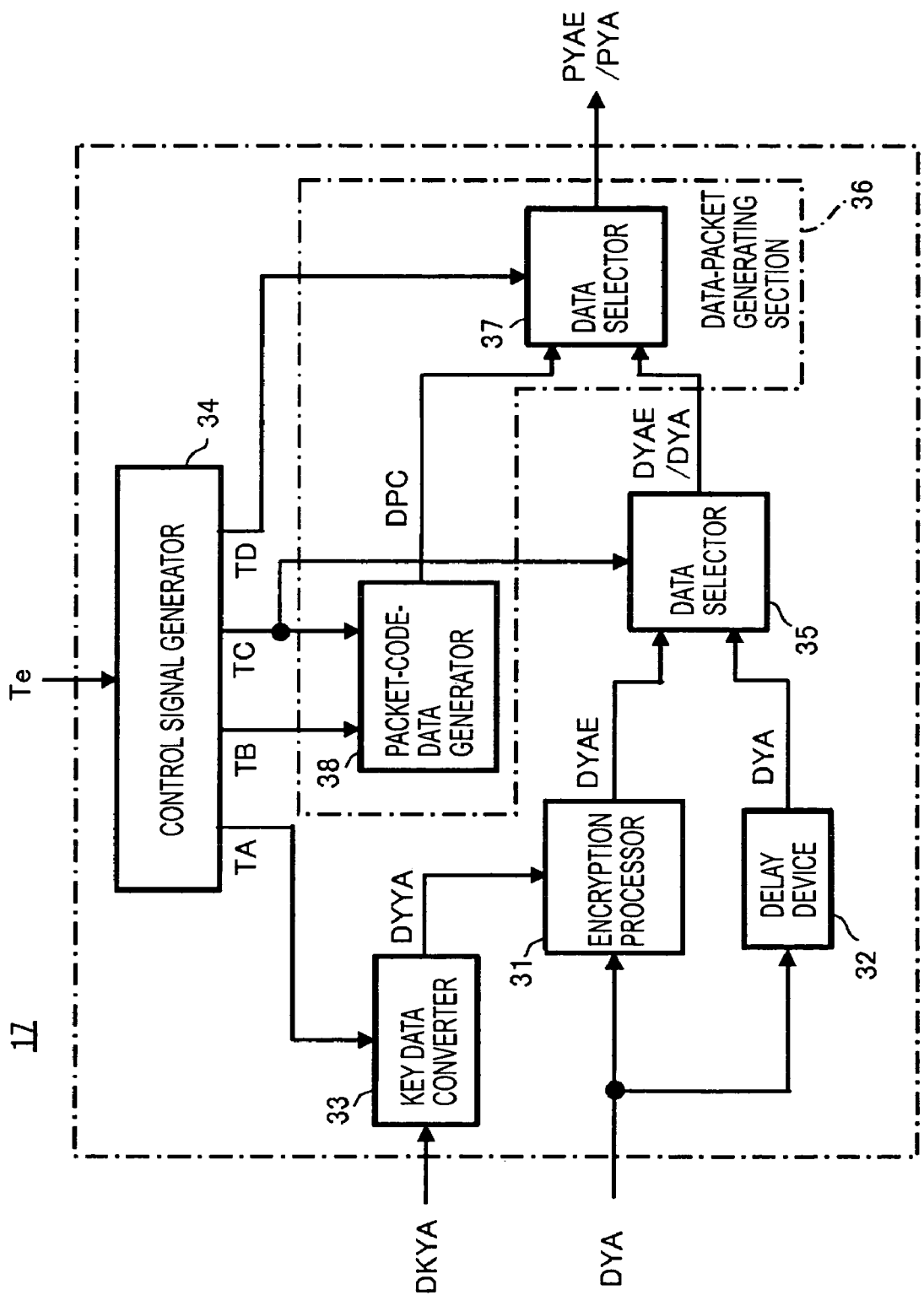

DATA TRANSMISSION METHOD

TECHNICAL FIELD

The present invention described in the claims of this application relates to a data transmission method of encrypting digital information data forming a data packet and transmitting the encrypted data and a data transmission apparatus implementing the data transmission method, and to a data reception method of receiving the transmitted encrypted data and decrypting the encrypted data to reproduce the original data and a data reception apparatus implementing the data reception method.

BACKGROUND ART

In transmission of digital data representing a variety of signal information etc., encrypting the digital data to be transmitted at a transmission side and decrypting the encrypted digital data to reproduce the original data at a reception side are proposed in order to prevent, for example, tapping in the data transmission path. Known and typical encryption algorithms adopted in the encryption of digital data include a data encryption standard (DES) method published by the National Bureau of Standards (NBS) in the US Department of Commerce in 1977 and an advanced encryption standard (AES) method published by the National Institute of Standards and Technology (NIST) under the jurisdiction of the US Department of Commerce in 2001 (for example, refer to "ADVANCED ENCRYPTION STANDARD (AES) (FIPS PUB 197)", Nov. 26, 2001, Department of Commerce, National Institute of Standards and Technology, Information Technology Laboratory).

Basically, in the encrypted transmission by the DES method or the AES method, digital data to be transmitted is encrypted in accordance with a rule defined in key data (encryption key data) separately provided and the encrypted digital data is decrypted in accordance with a rule defined in key data (decryption key data) separately provided. Key data (common key data) is used as the encryption key data and the decryption key data. The algorithms for the encryption and the decryption are disclosed, and the common key data is kept secret to ensure confidentiality.

In the field of video signals, digitization is encouraged in order to realize diversification of transmitted information and increase in quality of reproduced images. For example, high definition television (HDTV) systems that process digital video signals formed of digital data representing information concerning the video signals have been proposed. Digital video signals (hereinafter referred to as HD signals) in the HDTV systems are formed in accordance with, for example, the BTA S-002 standard established by the Broadcasting Technology Association (BTA) (refer to "BTA S-002 1125/60 Kouseido terebijon houshiki sutajio dhizitaru eizo kikaku", February 1992, BTA) and have a Y-$P_B/P_R$ format and a G-B-R format. In the Y-$P_B/P_R$ format, Y means a luminance signal and $P_B/P_R$ means a color difference signal. In the G-B-R format, G means a green primary color signal, B means a blue primary color signal, and R means a red primary color signal.

For example, each frame period in each of the HD signals is divided into a first field period and a second field period. The HD signal has a frame rate of 30 Hz (a field rate of 60 Hz), has 1,125 lines for every frame period, has 2,200 data samples for every line, and has a sampling frequency of 74.25 MHz. The HD signal in the Y-$P_B/P_R$ format complies with a data format shown in FIG. 1.

In the data format in FIG. 1, reference letter A in FIG. 1 indicates part of one line in a luminance-signal data sequence (Y data sequence) representing a luminance signal component in the video signal, and reference letter B in FIG. 1 indicates part of one line in a color-difference-signal data sequence ($P_B/P_R$ data sequence) representing a color difference signal component in the video signal. Each word data forming the Y data sequence and the $P_B/P_R$ data sequence includes, for example, 10 bits. In other words, each of the Y data sequence and the $P_B/P_R$ data sequence is 10-bit word sequence data having continuous 10-bit words and has a word transmission rate of, for example, 74.25 Mwps.

Each line of the Y data sequence has a line blanking area and video data continuously formed therein. In the Y data sequence, timing reference code data (SAV: Start of Active Video) including four words (3FF(Y), 000(Y), 000(Y), and XYZ(Y); since "3FF" and "000" are hexadecimal numbers, "h" indicating the hexadecimal number is added to "3FF" and "000", which are represented as "3FFh" and "000h", and (Y) indicates a word in the Y data sequence), each word including 10 bits, is arranged immediately before the video data. Timing reference code data (EAV: End of Active Video) including four words (3FF(Y), 000(Y), 000(Y), and XYZ(Y)), each word including 10 bits, is arranged immediately after the video data. Also in the $P_B/P_R$ data sequence, SAV including four words (3FF(C), 000(C), 000(C), and XYZ(C); (C) indicates a word in the $P_B/P_R$ data sequence), each word including 10 bits, is arranged immediately before the video data, and EAV including four words (3FF(C), 000(C), 000(C), and XYZ(C)), each word including 10 bits, is arranged immediately after the video data. The EAV and SAV in the Y data sequence are arranged in the line blanking area in the Y data sequence, and the EAV and SAV in the $P_B/P_R$ data sequence are arranged in the line blanking area in the $P_B/P_R$ data sequence.

Among the four words (3FF(Y), 000(Y), 000(Y), and XYZ(Y) or 3FF(C), 000(C), 000(C), and XYZ(C)), the first three words ((3FF(Y), 000(Y), and 000(Y) or 3FF(C), 000(C), and 000(C)) are provided for establishing word synchronization or line synchronization, and the last one word (XYZ(Y) or XYZ(C)) is provided for discriminating between the first field and the second field in the same frame or for discriminating between the timing reference code data EAV and the timing reference code data SAV.

In the HD signal including the Y data sequence and the $P_B/P_R$ data sequence, multiple codes that includes timing identification codes forming the timing reference codes data SAV and EAV and that are not used as information codes forming the video data are defined for the Y data sequence and the $P_B/P_R$ data sequence as inhibited codes. The inhibited codes are equal to 000h to 003h and 3FCh to 3FFh (hexadecimal numbers), that is, 0000000000 to 0000000011 and 1111111100 to 1111111111 when the Y data sequence and the $P_B/P_R$ data sequence are 10-bit word sequence data.

Auxiliary data used for transmitting information different from the digital video signal represented by the video data is arranged in the line blanking area in the Y data sequence and the $P_B/P_R$ data sequence, in addition to line number data and error detection code data. The auxiliary data is standardized in accordance with the BTA S-005B standard (refer to "BTA S-005B 1125/60 houshiki HDTV bitto chokuretsu intafeisu ni okeru hojo deta no kyoutsuu kikaku", March 1998, ARIB) established by the Association of Radio Industries and Business (ARIB).

The standardized auxiliary data forms a data packet including a predetermined number (one or more) of words. A first format shown by reference letter A in FIG. 2 and a second format shown by reference letter B in FIG. 2 are set for the data packet formed of the auxiliary data (auxiliary data packet).

The auxiliary data packet in the first format (shown by reference numeral A in FIG. 2) includes 7 to 262 words (each word includes 10 bits). In the auxiliary data packet in the first format, a three-word auxiliary data flag (ADF), a one-word data identification word (DID), a one-word data block number word (DBN), a one-word data count word (DC), a user data word (UDW) of 0 to 255 words, and a one-word checksum word (CS) are sequentially arranged. The auxiliary data packet in the second format (shown by reference letter B in FIG. 2) differs from the auxiliary data packet in the first format in that a one-word second data identification word (SDID) is used instead of the one-word data block number word (DBN) but is similar to the auxiliary data packet in the first format in other aspects.

The ADF denotes the start of the auxiliary data packet and has continuous three words arranged therein, which are a combination of 000h, 3FFh, and 3FFh and to which the inhibited codes described above are set. The DID denotes a type of the UDW. Eight bits among the 10 bits are used for information and the higher two bits are used for avoiding the inhibited codes. The DBN denotes the order of the auxiliary data packets having the same DID. Eight bits among the 10 bits are used for information and the higher two bits are used for avoiding the inhibited codes. The DC denotes the number (0 to 255) of words in the UDW. Eight bits among the 10 bits are used for information and the higher two bits are used for avoiding the inhibited codes.

The UDW is 10-bit data which includes no inhibited code and to which a code within a range from 004h to 3FBh is set, and is information data representing information to be transmitted in the auxiliary data. The CS denotes a checksum value. Nine bits among the 10 bits are used for information and the highest one bit is used for avoiding the inhibited codes. The SDID denotes a type of the UDW, like the DID. Eight bits among the 10 bits are used for information and the higher two bits are used for avoiding the inhibited codes.

When the auxiliary data is used for transmitting digital audio information (digital audio auxiliary data), the digital audio auxiliary data is standardized, separately from the general auxiliary data, in accordance with the BTA S-006B standard ("BTA S-006B 1125/60 houshiki HDTV bitto chokuretsu intafeisu ni okeru dhizitaru onsei kikaku", March 1998, ARIB) established by the ARIB described above.

The standardized digital audio auxiliary data also forms a data packet having a predetermined number (one or more) of words. The data packet formed of the digital audio auxiliary data (audio data packet) has the first format shown by reference letter A in FIG. 2, as shown in FIG. 3.

The audio data packet (FIG. 3) includes 31 words (each word includes 10 bits). In the audio data packet, a three-word ADF, a one-word DID, a one-word DBN, a one-word DC, a 24-word UDW, and a one-word CS are sequentially arranged.

In the audio data packet, the ADF denotes the start of the audio data packet and has continuous three words arranged therein, which are a combination of 000h, 3FFh, and 3FFh and to which the inhibited codes described above are set. The DID indicates that the content of the UDW is digital audio information. Eight bits among the 10 bits are used for information and the higher two bits are used for avoiding the inhibited codes. Specifically, for example, the DID set to a code 2E7h indicates information belonging to an audio group 1 on channels 1 to 4, the DID set to a code 1E6h indicates information belonging to an audio group 2 on channels 5 to 8, the DID set to a code 1E5h indicates information belonging to an audio group 3 on channels 9 to 12, and the DID set to a code 2E4h indicates information belonging to an audio group 4 on channels 13 to 16. The DBN, DC, and the CS are similar to those in the auxiliary data packet described above.

The UDW is digital audio information data representing digital audio information to be transmitted in the digital audio auxiliary data. In each word in the digital audio information data, the remaining eight bits, excluding the higher two bits among the 10 bits, normally serve as information bits. In each of the 24 words in the UDW, eight bits among the 10 bits are used for information and the higher two bits are used for avoiding the inhibited codes. In the 24 words, the first two words (UDW0 and UDW1) represent audio clock phase information, the 16 words from the third word to the eighteenth word (UDW2 to UDW 17) represent digital audio data, and the six words from the nineteenth word to the last word (UDW18 to UDW23) represent error correction data.

When the HD signal including the Y data sequence or the HD signal including the $P_B/P_R$ data sequence, described above, is transmitted, it is desirable to realize serial transmission in which the word sequence data is converted into serial data for transmission because the data transmission path is simplified in the serial transmission. The serial transmission of the HD signals including the Y data sequence and the $P_B/P_R$ data sequence is standardized so as to perform transmission in compliant with a high definition-serial digital interface (HD-SDI) in the BTA S-004 standard (refer to "BTA S-004 1125/60 houshiki HDTV shingou no bitto chokuretsu intafeisu kikaku", April 1995, BTA) established by the BTA described above.

In the transmission compliant with the HD-SDI, word multiplexing is performed for the Y data sequence and the $P_B/P_R$ data sequence in synchronization with the line blanking area having the EAV and the SAV arranged therein to form a word multiplexed data sequence shown in FIG. 4 as 10-bit word sequence data having a word transmission rate of 74.25 Mwps×2=148.5 Mwps. In the word multiplexed data sequence, multiplexed timing reference code data (multiplexed SAV) including eight words (3FF(C), 3FF(Y), 000(C), 000(Y), 000(C), 000(Y), XYZ(C), and XYZ(Y)), each word including 10 bits, is arranged immediately before the video data, and multiplexed timing reference code data (multiplexed EAV) including eight words (3FF(C), 3FF(Y), 000 (C), 000(Y), 000(C), 000(Y), XYZ(C), and XYZ(Y)), each word including 10 bits, is arranged immediately after the video data.

The bits, from the least significant bit (LSB) to the most significant bit (MSB), in each of the 10-bit words in the word multiplexed data sequence are sequentially transmitted to convert the parallel data to the serial data, scrambling is performed for the serial data to generate a serial transmission HD signal (hereinafter referred to as an HD-SDI signal), and the HD-SDI signal is transmitted through the data transmission path. The HD-SDI signal has a bit transmission rate of, for example, 148.5 Mwps×10 bits=1.485 Gbps.

In the transmission of the HD-SDI signal through the data transmission path, described above, there are cases in which it is desirable that the HD-SDI signal be encrypted at the transmission side and the encrypted HD-SDI signal be decrypted to reproduce the original HD-SDI signal at the reception side in order to prevent, for example, tapping on the data transmission path to improve the security of the information transmission. In principle, the encrypted transmission of the HD-SDI signal can also be performed in the encrypted transmission system adopting the DES method or the AES method described above.

Encrypting the video data in the HD signal that forms the HD-SDI signal and that includes the Y data sequence and the $P_B/P_R$ data sequence to generate encrypted video data, which include no inhibited code, forming an encrypted HD signal including the encrypted video data, performing parallel-serial (P/S) conversion for the encrypted HD signal to generate an encrypted HD-SDI signal, and transmitting the encrypted HD-SDI signal through the data transmission path have already been proposed by the applicant of this application in the patent application No. 2002-135039 filed in May 10, 2002.

Although the transmission of the HD-SDI signal including the video data subjected to the encryption through the data transmission path has already been proposed, it is desirable that auxiliary data, for example, the digital audio auxiliary data, included in the HD signal forming the HD-SDI signal be encrypted in order to further improve the security in the information transmission. Specifically, it is desirable to form an encrypted HD signal including encrypted auxiliary data, to perform the P/S conversion for the encrypted HD signal to generate an encrypted HD-SDI signal, and to transmit the encrypted HD-SDI signal through the data transmission path.

Accordingly, in the transmission of the HD-SDI signal, encrypting the UDW in the auxiliary data packet formed of the auxiliary data included in the HD signal forming the HD-SDI signal, as in the video data, to generate an encrypted UDW, forming an encrypted auxiliary data packet including the encrypted UDW, generating an encrypted HD signal including the encrypted auxiliary data packet, and transmitting an encrypted HD-SDI signal based on the encrypted HD signal are suggested.

However, the generation of the encrypted HD signal including the encrypted auxiliary data packet and the transmission of the encrypted HD-SDI signal based on the encrypted HD signal by using technologies already proposed have the following disadvantages.

First, problems can be caused at the reception side receiving the encrypted HD-SDI signal to generate the encrypted auxiliary data packet. Although such problems are not caused when the receiving apparatus receiving the encrypted HD-SDI signal to generate the encrypted auxiliary data packet from the encrypted HD-SDI signal includes decryption means for decrypting the encrypted UDW included in the encrypted auxiliary data packet to reproduce the original UDW, the problems are caused when the receiving apparatus does not include the decryption means, for example, when known receiving apparatuses are used.

For example, when the encrypted auxiliary data packet is an encrypted audio data packet including the UDW having encrypted digital audio information, a-receiving apparatus generating the encrypted audio data packet from the encrypted HD-SDI signal detects an ADF included in the encrypted audio data packet to recognize the start of the encrypted audio data packet, extracts the encrypted UDW from the encrypted audio data packet, and supplies the encrypted UDW to an audio reproducing unit. When the receiving apparatus includes the decryption means in the audio reproducing unit, the decryption means in the audio reproducing unit performs the decryption for the encrypted UDW to generate a UDW having the original digital audio information, an appropriate reproduced audio signal based on the generated UDW is generated, and the reproduced audio signal is supplied to audio reproducing means, for example, a speaker. As a result, an appropriate reproduced sound based on the appropriate reproduced audio signal is output from the speaker. In contrast, when the receiving apparatus does not include the decryption means in the audio reproducing unit, an undesired audio signal based on the encrypted UDW is generated because the decryption is not performed for the encrypted UDW in the audio reproducing unit, and the undesired audio signal is supplied to the audio reproducing means, for example, the speaker. As a result, for example, an excessive current based on the undesired audio signal is possibly applied to the speaker to damage the speaker.

Next, for example, when the encrypted auxiliary data packet is an encrypted audio data packet including the UDW having encrypted digital audio information, the encryption possibly causes a reduction in performance of the error correction of the encrypted UDW based on the UDW including an error correction code.

Furthermore, for example, a stream converter using a first-in first-out (FIFO) memory can be used for the encryption in the generation of the encrypted auxiliary data packet. In such a case, since some lines in the Y data sequence and the $P_B/P_R$ data sequence forming the HD signal are largely occupied by the auxiliary data, the writing period for the FIFO memory is not sufficiently provided to cause a state in which the FIFO memory is emptied. As a result, a reduction in quality of the encryption security of the encrypted auxiliary data packet is probably caused.

In the generation of the encrypted HD signal including the encrypted auxiliary data packet and the transmission of the encrypted HD-SDI signal based on the encrypted HD signal, having the above disadvantages, it is desirable that the encryption be selectively performed for every auxiliary data packet in each line in the Y data sequence and the $P_B/P_R$ data sequence forming the HD signal in order to improve the flexibility in the actual use.

The present invention described in the claims of this application provides a data transmission method capable of generating the encrypted auxiliary data packet by the encryption of the auxiliary data packet formed of the auxiliary data included in a signal, such as the HD signal, forming the HD-SDI signal, capable of generating the encrypted signal, such as the encrypted HD signal, including the encrypted auxiliary data packet, and capable of transmitting the serial signal, such as the encrypted HD-SDI signal, based on the encrypted signal such that the disadvantages involved in the application of the above known technologies that have been proposed can be avoided and the encryption can be selectively performed for every auxiliary data packet, and provides a data transmission apparatus implementing the data transmission method. In addition, the present invention provides a data reception method capable of receiving the serial signal, such as the encrypted HD-SDI signal, formed and transmitted based on the encrypted signal, such as the encrypted HD signal, including the encrypted auxiliary data packet, the encrypted auxiliary data packet being generated by the encryption of the auxiliary data packet formed of the auxiliary data included in a signal, such as the HD signal, forming the HD-SDI signal, capable of generating the encrypted signal, such as the encrypted HD signal, and the encrypted auxiliary data packet from the serial signal, such as the encrypted HD-SDI signal, and capable of performing the decryption for the generated encrypted auxiliary data packet to reproduce the auxiliary data forming the original auxiliary data packet, and provides a data reception apparatus implementing the data reception method.

DISCLOSURE OF INVENTION

A data transmission method according to the invention described in any of Claims 1 to 3 in the claims of this application includes the steps of performing encryption for information data included in a data packet having a data flag formed of a first combination of a plurality of inhibited codes that are not used as information codes representing information, the information data being formed without using the inhibited codes, so as not to generate the inhibited codes in order to generate encrypted information data that includes no inhibited codes; replacing the first combination of the plurality of inhibited codes in the data flag in the data packet with a second combination of the inhibited codes, the second combination being different from the first combination, to form an encrypted data packet that has the replaced data flag and that includes the encrypted information data; and transmitting the encrypted data packet.

A data transmission method according to the invention described in any of Claims 4 to 6 in the claims of this application includes the steps of performing encryption for information data included in a data packet having a data flag formed of a predetermined combination of a plurality of inhibited codes that are not used as information codes representing information, the information data being formed without using the inhibited codes, the data flag being followed by identification data that includes a first code other than the inhibited codes to represent a type of the information data, so as not to generate the inhibited codes in order to generate encrypted information data that includes no inhibited codes; replacing the first code included in the identification data in the data packet with a second code that is different from the first code and that is other than the inhibited codes to form an encrypted data packet that has the data flag followed by the replaced identification data and that includes the encrypted information data; and transmitting the encrypted data packet.

A data transmission apparatus according to the invention described in any of Claims 7 to 9 in the claims of this application includes an encryption processing unit configured to perform encryption for information data included in a data packet having a data flag formed of a first combination of a plurality of inhibited codes that are not used as information codes representing information, the information data being formed without using the inhibited codes, so as not to generate the inhibited codes in order to generate encrypted information data that includes no inhibited codes; an encrypted-data-packet forming unit configured to replace the first combination of the plurality of inhibited codes in the data flag in the data packet with a second combination of the inhibited codes, the second combination being different from the first combination, to form an encrypted data packet that has the replaced data flag and that includes the encrypted information data generated by the encryption processing unit; and a data transmitting unit configured to transmit the encrypted data packet formed by the encrypted-data-packet forming unit.

A data transmission apparatus according to the invention described in any of Claims 10 to 12 in the claims of this application includes an encryption processing unit configured to perform encryption for information data included in a data packet having a data flag formed of a predetermined combination of a plurality of inhibited codes that are not used as information codes representing information, the information data being formed without using the reserved codes, the data flag being followed by identification data that includes a first code other than the reserved codes to represent a type of the information data, so as not to generate the inhibited codes in order to generate encrypted information data that does not use the inhibited codes; an encrypted-data-packet forming unit configured to replace the first code included in the identification data in the data packet with a second code that is different from the first code and that is other than the reserved codes to form an encrypted data packet that has the data flag followed by the replaced identification data and that includes the encrypted information data generated by the encryption processing unit; and a data transmitting unit configured to transmit the encrypted data packet formed by the encrypted-data-packet forming unit.

A data reception method according to the invention described in any of Claims 13 to 15 in the claims of this application includes the steps of receiving encrypted data packet that is transmitted and that has a data flag formed of a second combination of a plurality of inhibited codes that are not used as information codes representing information, with which second combination of the inhibited codes a first combination of the inhibited codes is replaced, the second combination being different from the first combination, the encrypted data packet including encrypted information data that includes no reserved codes and that results from encryption performed for information data formed without using the inhibited codes so as not to generate the inhibited codes; performing decryption for the encrypted information data included in the encrypted data packet to generate reproduced information data; detecting the data flag included in the encrypted data packet; and extracting the reproduced information data in accordance with a detection output resulting from the detection.

A data reception method according to the invention described in any of Claims 16 to 18 in the claims of this application includes the steps of receiving encrypted data packet that is transmitted, that has a data flag formed of a predetermined combination of a plurality of inhibited codes that are not used as information codes representing information, and that includes encrypted information data resulting from encryption performed for information data formed without using the inhibited codes so as not to generate the inhibited codes and including no reserved codes, the data flag being followed by identification data that has a second code other than the inhibited codes, with which second code a first code that is other than the inhibited codes and that represents a type of the information data is replaced, the second code being different from the first code; performing decryption for the encrypted information data included in the encrypted data packet to generate reproduced information data; detecting the identification data included in the encrypted data packet; and extracting the reproduced information data in accordance with a detection output resulting from the detection.

A data reception apparatus according to the invention described in any of Claims 19 to 21 in the claims of this application includes a data-sequence reproducing unit configured to receive encrypted data packet that is transmitted and that has a data flag formed of a second combination of a plurality of inhibited codes that are not used as information codes representing information, with which second combination of the inhibited codes a first combination of the inhibited codes is replaced, the second combination being different from the first combination, the encrypted data packet including encrypted information data that includes no inhibited codes and that results from encryption performed for information data formed without using the inhibited codes so as not to generate the inhibited codes; a decryption processing unit configured to perform decryption for the encrypted information data included in the encrypted data packet received by the data-sequence reproducing unit to generate reproduced information data; a data detecting unit configured to detect the data flag included in the encrypted data packet; and a data selecting unit configured to extract the reproduced information data generated by the decryption processing unit in accordance with a detection output supplied from the data detecting unit.

A data reception apparatus according to the invention described in any of Claims 22 to 24 in the claims of this application includes a data-sequence reproducing unit configured to receive encrypted data packet that is transmitted, that has a data flag formed of a predetermined combination of a plurality of inhibited codes that are not used as information codes representing information, and that includes encrypted information data resulting from encryption performed for information data formed without using the inhibited codes so as not to generate the inhibited codes and including no inhibited codes, the data flag being followed by identification data that has a second code other than the inhibited codes, with which second code a first code that is other than the inhibited codes and that represents a type of the information data is replaced, the second code being different from the first code; a decryption processing unit configured to perform decryption for the encrypted information data included in the encrypted data packet received by the data-sequence reproducing unit to generate reproduced information data; a data detecting unit configured to detect the identification data included in the encrypted data packet; and a data selecting unit configured to extract the reproduced information data generated by the decryption processing unit in accordance with a detection output supplied from the data detecting unit.

In the data transmission method according to the invention described in any of Claims 1 to 3 in the claims of this application or the data transmission apparatus according to the invention described in any of Claims 7 to 9 in the claims of this application, the encryption is performed for the information data included in the data packet having the data flag so as not to generate the inhibited codes to generate the encrypted information data including no inhibited codes; the first combination of the plurality of inhibited codes in the data flag is replaced with the second combination of the inhibited codes, the second combination being different from the first combination, to form the encrypted data packet that has the replaced data flag and that includes the encrypted information data; and the encrypted data packet is transmitted.

The encrypted information data including no inhibited codes is generated and the encrypted data packet including the encrypted information data is transmitted in the above manner. Accordingly, in the generation of encrypted serial data based on the transmitted encrypted data packet, the encrypted serial data does not include a part in which undesired inhibited codes are converted into serial data.

The first combination of the plurality of inhibited codes forming the data flag included in the encrypted data packet is replaced with the second combination of the inhibited codes, different from the first combination. Accordingly, when the receiving apparatus receiving the transmitted encrypted data packet does not include decrypting means for the encrypted information data included in the encrypted data packet, the data flag is not detected and, therefore, the encrypted data packet is not received, so that reproduction of information data based on the encrypted information data included in the encrypted data packet is not performed. Consequently, for example, when the encrypted data packet is an encrypted audio data packet including encrypted digital audio information data having encrypted digital audio information and the receiving apparatus receiving the encrypted data packet has a speaker, serving as audio reproducing means for reproducing audio based on the reproduced digital audio information, but does not have the decrypting means for the encrypted information data included in the encrypted data packet, an undesirable audio signal formed based on the encrypted information data is not supplied to the speaker. As a result, a situation in which an excessive current based on the undesired audio signal is applied to the speaker to damage the speaker can be avoided.

In the data transmission method according to the invention described in Claim 2 or the data transmission apparatus according to the invention described in Claim 8, the error correction data for the encrypted information data is generated along with the encrypted information data and the encrypted information data and the error correction data corresponding to the encrypted information data are included in the encrypted data packet. Accordingly, a situation in which the encryption causes a reduction in performance of the error correction of the encrypted information data can be avoided.

In the data transmission method according to the invention described in Claim 3 or the data transmission apparatus according to the invention described in Claim 9, the data packet is included in each of the data sequences and the encrypted data packet based on the data packet is formed for every data sequence. Accordingly, even when a stream converter using an FIFO memory is used in the encryption in order to form an encrypted auxiliary data packet, a situation in which the writing period for the FIFO memory is not sufficiently provided to empty the FIFO memory does not arise. Consequently, a reduction in quality of the encryption security of the encrypted auxiliary data packet is not caused.

With the data transmission method according to the invention described in any of Claims 1 to 3 in the claims of this application or the data transmission apparatus according to the invention described in any of Claims 7 to 9 in the claims of this application, when the encrypted HD signal including the encrypted auxiliary data packet is formed and the encrypted HD-SDI signal based on the encrypted HD signal is transmitted, it is possible to selectively perform the encryption for every auxiliary data packet in each line of the Y data sequence and the $P_B/P_R$ data sequence forming the HD signal, thus improving the flexibility in the actual use.

In the data transmission method according to the invention described in any of Claims 4 to 6 in the claims of this application or the data transmission apparatus according to the invention described in any of Claims 10 to 12 in the claims of this application, the encryption is performed for the information data included in the data packet having the data flag followed by the identification data so as not to generate the inhibited codes to generate encrypted information data that includes no inhibited codes; the first code in the identification data in the data packet is replaced with the second code that is different from the first code and that is other than the inhibited codes to form the encrypted data packet that has the data flag followed by the replaced identification data and that includes the encrypted information data; and the encrypted data packet is transmitted.

The encrypted information data including no inhibited codes is generated and the encrypted data packet including the encrypted information data is transmitted in the above manner. Accordingly, in the generation of encrypted serial data based on the transmitted encrypted data packet, the encrypted serial data does not include a part in which undesired inhibited codes are converted into serial data.

The first code in the identification data representing a type of the encrypted information data is replaced with the second code that is other than the inhibited codes and that is different from the first code. Accordingly, when the receiving apparatus receiving the transmitted encrypted data packet does not include decrypting means for the encrypted information data included in the encrypted data packet, the type of the original information data represented by the identification data before the replacement is not recognized and, therefore, the data provided as the reproduced information data based on the encrypted information data included in the encrypted data packet is not processed as data belonging to the type of the original information data represented by the identification data before the replacement. Consequently, for example, when the encrypted auxiliary data packet is an encrypted audio data packet including encrypted digital audio information data having encrypted digital audio information and the receiving apparatus receiving the encrypted data packet has a speaker, serving as audio reproducing means for reproducing audio based on the reproduced digital audio information, but does not have the decrypting means for the encrypted information data included in the encrypted data packet, no signal based on the encrypted information data is supplied to the speaker and, therefore, an undesirable audio signal generated based on the encrypted information data is not supplied to the speaker. As a result, a situation in which an excessive current based on the undesired audio signal is applied to the speaker to damage the speaker can be avoided.

In the data transmission method according to the invention described in Claim 5 or the data transmission apparatus according to the invention described in Claim 11, the error correction data for the encrypted information data is generated along with the encrypted information data and the encrypted information data and the error correction data corresponding to the encrypted information data are included in the encrypted data packet. Accordingly, a situation in which the encryption causes a reduction in performance of the error correction of the encrypted information data can be avoided.

In the data transmission method according to the invention described in Claim 6 or the data transmission apparatus according to the invention described in Claim 12, the data packet is included in each of the data sequences and the encrypted data packet based on the data packet is formed for every data sequence. Accordingly, even when a stream converter using an FIFO memory is used in the encryption in order to form an encrypted auxiliary data packet, a situation in which the writing period for the FIFO memory is not sufficiently provided to empty the FIFO memory does not arise. Consequently, a reduction in quality of the encryption security of the encrypted auxiliary data packet is not caused.

With the data transmission method according to the invention described in any of Claims 4 to 6 in the claims of this application or the data transmission apparatus according to the invention described in any of Claims 10 to 12 in the claims of this application, when the encrypted HD signal including the encrypted auxiliary data packet is formed and the encrypted HD-SDI signal based on the encrypted HD signal is transmitted, it is possible to selectively perform the encryption for every auxiliary data packet in each line of the Y data sequence and the $P_B/P_R$ data sequence forming the HD signal, thus improving the flexibility in the actual use.

In the data transmission method according to the invention described in any of Claims 1 to 6 in the claims of this application or the data transmission apparatus according to the invention described in any of Claims 7 to 12 in the claims of this application, it is possible to form the encrypted auxiliary data packet by the encryption of the auxiliary data packet formed of the auxiliary data included in the HD signal forming the HD-SDI signal, to generate the encrypted HD signal including the encrypted auxiliary data packet, and to transmit the encrypted HD-SDI signal based on the encrypted HD signal while selectively performing the encryption for every auxiliary data packet and avoiding the disadvantages involved in the application of proposed technologies described above.

In the data reception method according to the invention described in any of Claims 13 to 15 in the claims of this application or the data reception apparatus according to the invention described in any of Claims 19 to 21 in the claims of this application, the encrypted data packet that is transmitted, that includes the encrypted information data including no inhibited codes, and that has the data flag formed of the second combination of a plurality of inhibited codes, with which second combination of the inhibited codes the first combination of the inhibited codes is replaced, the second combination being different from the first combination, is received; the decryption is performed for the encrypted information data included in the encrypted data packet to generate the reproduced information data; the data flag included in the encrypted data packet is detected; and the reproduced information data is extracted in accordance with the detection output resulting from the detection.

In the above process, the encrypted information data included in the encrypted data packet includes no inhibited codes. Accordingly, in the generation of encrypted serial data based on the transmitted encrypted data packet, the encrypted serial data does not include a part in which undesired inhibited codes are converted into serial data. Consequently, the reception of the encrypted data packet that is transmitted and that includes the encrypted information data including no inhibited codes does not have the disadvantage in that undesired inhibited codes are detected and, therefore, the encrypted data packet is not received.

In addition, the decryption is performed for the encrypted information data including no inhibited codes, in the received encrypted data packet, to generate the reproduced information data. The data flag formed of the first combination of the inhibited codes is replaced with the second combination of the inhibited codes, the second combination being different from the first combination, is detected and a timing when the reproduced information data is generated is detected based on the detection output representing the reception of the encrypted data packet. At a timing detected based on the detection output representing the reception of the encrypted data packet, the reproduced information data resulting from the decryption performed for the encrypted information data is extracted. Accordingly, appropriate reproduced information-data can be reproduced.

In the data reception method according to the invention described in any of Claims 16 to 18 in the claims of this application or the data reception apparatus according to the invention described in any of Claims 22 to 24 in the claims of this application, the encrypted data packet that is transmitted, that has the data flag formed of the inhibited codes, and that includes the encrypted information data including no inhibited codes, the data flag being followed by the identification data that has the second code other than the inhibited codes, with which second code the first code is replaced, the second code being different from the first code, is received; the decryption is performed for the encrypted information data included in the encrypted data packet to generate the reproduced information data; the identification data included in the encrypted data packet is detected; and the reproduced information data is extracted in accordance with the detection output resulting from the detection.

In the above process, the encrypted information data included in the encrypted data packet includes no inhibited codes. Accordingly, in the generation of encrypted serial data based on the transmitted encrypted data packet, the encrypted serial data does not include a part in which undesired inhibited codes are converted into serial data. Consequently, the reception of the encrypted data packet that is transmitted and that includes the encrypted information data including no inhibited codes does not have the disadvantage in that undesired inhibited codes are detected and, therefore, the encrypted data packet is not received.

In addition, the decryption is performed for the encrypted information data including no inhibited codes, in the received encrypted data packet, to generate the reproduced information data. The identification data having the second code other than the inhibited codes, different from the original first code, with which second code the first code is replaced, is detected and a timing when the reproduced information data is generated is detected based on the detection output representing the timing corresponding to the position of the identification data in the encrypted data packet. At the detected timing, the reproduced information data resulting from the decryption performed for the encrypted information data is extracted. Accordingly, appropriate reproduced information data can be reproduced.

BRIEF DESCRIPTION OF THE DRAWINGS

FIG. 2 includes conceptual diagrams illustrating a data format of an auxiliary data packet formed of auxiliary data in the HD signal.

FIG. 3 is a conceptual diagram illustrating a data format of an audio data packet formed of digital audio auxiliary data in the HD signal.

FIG. 6 is a conceptual diagram showing a data format used in the description of the example of the data transmission apparatus shown in FIG. 5.

FIG. 7 is a conceptual diagram showing another data format used in the description of the example of the data transmission apparatus shown in FIG. 5.

FIG. 8 is a block diagram showing an example of the structure of a Y-series auxiliary-information-data formatting unit shown in FIG. 5.

BEST MODE FOR CARRYING OUT THE INVENTION

Figure 1:
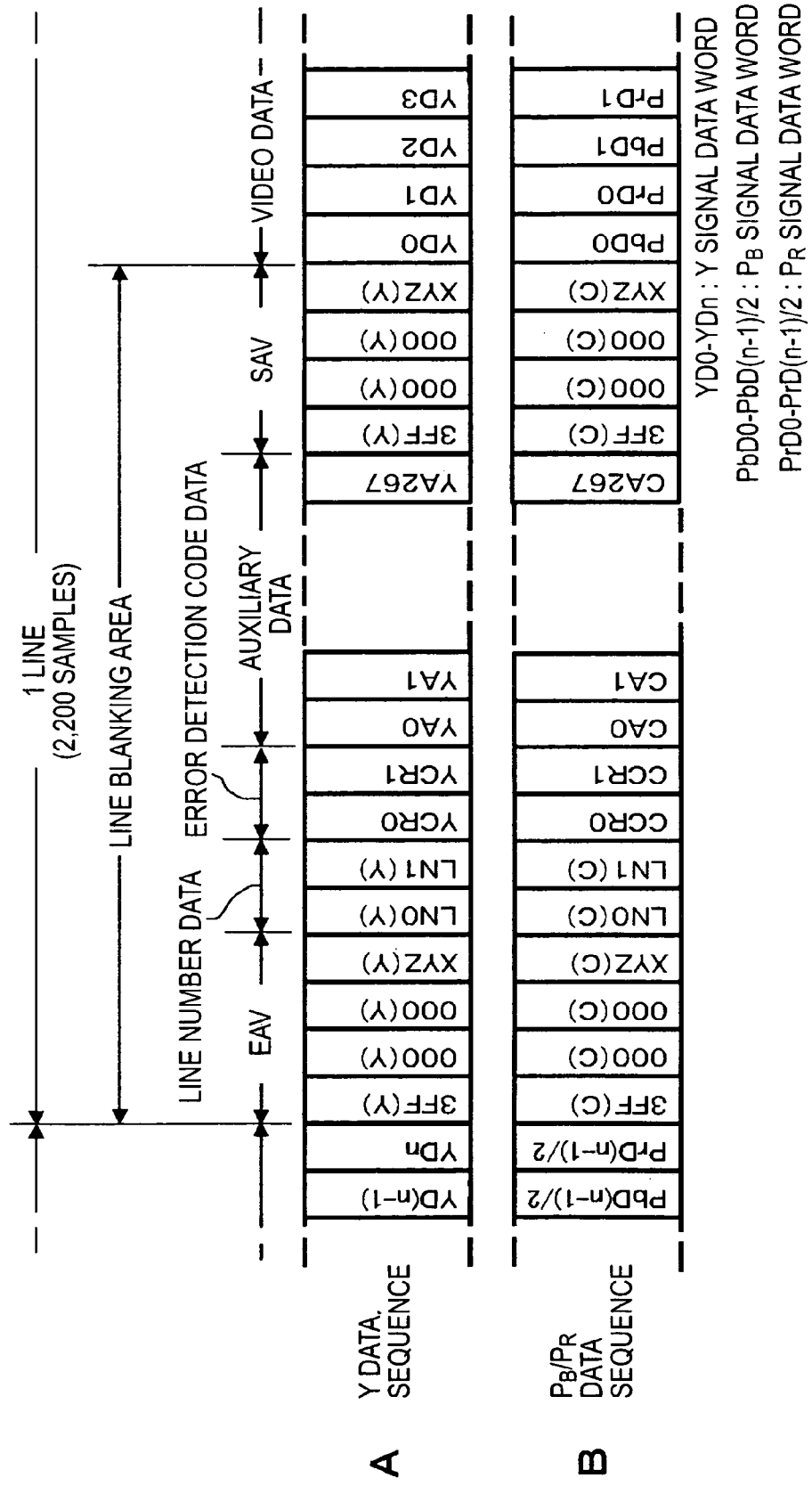
FIG. 1 includes conceptual diagrams illustrating an example of a data format of an HD signal.
Figure 4:
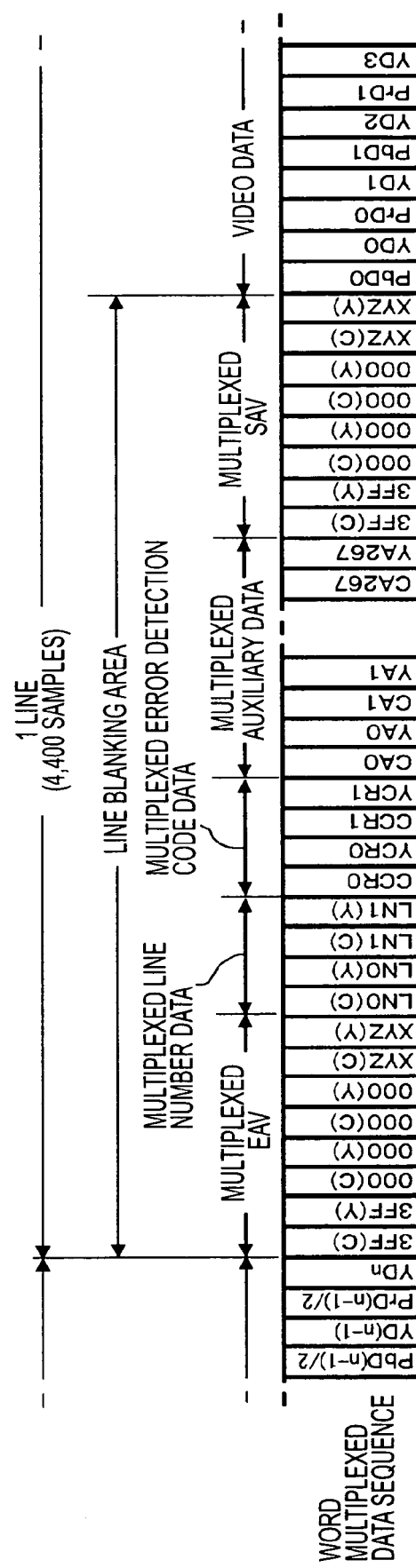
FIG. 4 is a conceptual diagram illustrating another example of the data format of the HD signal.
Figure 5:
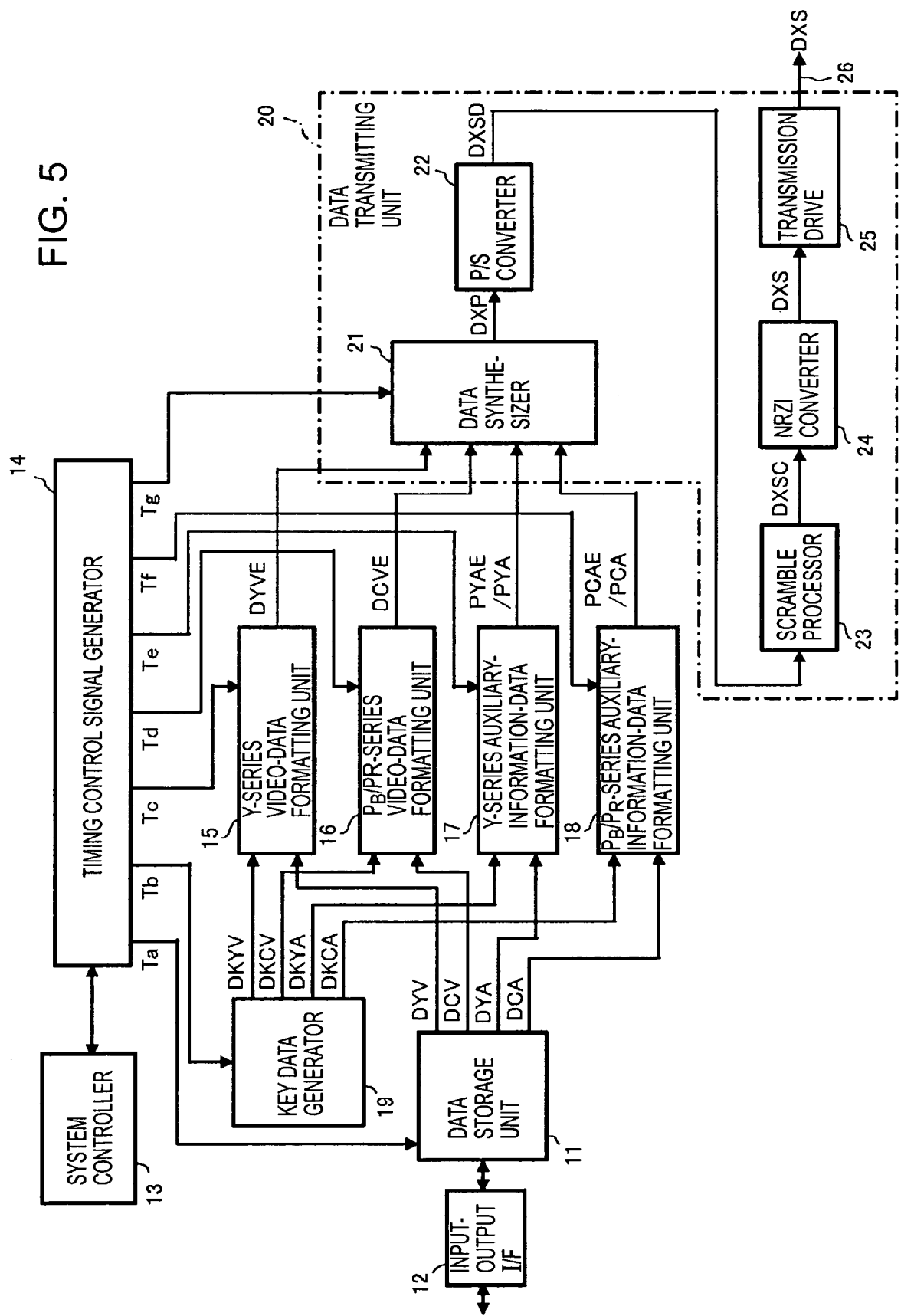
FIG. 5 is a block diagram showing an example of a data transmission apparatus according to the invention described in any of Claims 7 to 12 in the claims of this application, implementing an example of a data transmission method according to the invention described in any of Claims 1 to 6 in the claims of this application.

FIG. 5 shows an example of a data transmission apparatus according to the invention described in any of Claims 7 to 12 in the claims of this application, implementing an example of a data transmission method according to the invention described in any of Claims 1 to 6 in the claims of this application.

Referring to FIG. 5, the data transmission apparatus includes a data storage unit 11 storing Y-series video data and Y-series auxiliary information data, which forms the Y data sequence in an HD signal, and $P_B/P_R$-series video data and $P_B/P_R$-series auxiliary information data, which forms the $P_B/P_R$ data sequence in the HD signal. The Y-series video data, the $P_B/P_R$-series auxiliary information data, the Y-series auxiliary information data, and the $P_B/P_R$-series auxiliary information data are formed of, for example, 10-bit words. The data storage unit 11 is connected to an external data source via an input-output interface (I/F) 12.

A timing control signal Ta is supplied from a timing control signal generator 14 controlled by a system controller 13 controlling the entire data transmission apparatus to the data storage unit 11. The data storage unit 11 transmits Y-series video data DYV, $P_B/P_R$-series video data DCV, Y-series auxiliary information data DYA, and $P_B/P_R$-series auxiliary information data DCA at the timing specified by the timing control signal Ta. The Y-series auxiliary information data DYA and the $P_B/P_R$-series auxiliary information data DCA are, for example, digital audio information data.

The Y-series video data DYV, the $P_B/P_R$-series video data DCV, the Y-series auxiliary information data DYA, and the $P_B/P_R$-series auxiliary information data DCA are supplied from the data storage unit 11 to a Y-series video-data formatting unit 15, a $P_B/P_R$-series video-data formatting unit 16, a Y-series auxiliary-information-data formatting unit 17, and a $P_B/P_R$-series auxiliary-information-data formatting unit 18, respectively. Key data DKYV used for encrypting the Y-series video data, key data DKCV used for encrypting the $P_B/P_R$-series video data, key data DKYA used for encrypting the Y-series auxiliary information data, and key data DKCA used for encrypting the $P_B/P_R$-series auxiliary information data are also supplied from a key data generator 19 to the Y-series video-data formatting unit 15, the $P_B/P_R$-series video-data formatting unit 16, the Y-series auxiliary-information-data formatting unit 17, and the $P_B/P_R$-series auxiliary-information-data formatting unit 18, respectively. Timing control signals Tc, Td, Te, and Tf are also supplied from the timing control signal generator 14 to the Y-series video-data formatting unit 15, the $P_B/P_R$-series video-data formatting unit 16, the Y-series auxiliary-information-data formatting unit 17, and the $P_B/P_R$-series auxiliary-information-data formatting unit 18, respectively.

A timing control signal Tb is supplied from the timing control signal generator 14 to the key data generator 19. The key data generator 19 transmits the key data DKYV, DKCV, DKYA, and DKCA at the timing specified by the timing control signal Tb.

In the Y-series video-data formatting unit 15, the encryption by using the key data DKYV is performed by, for example, the AES method for the Y-series video data DYV in accordance with the timing control signal Tc so as not to generate inhibited codes (000h to 003h and 3FCh to 3FFh) in order to generate encrypted Y-series video data DYVE that is based on the Y-series video data DYV and that includes no inhibited codes. Similarly, in the $P_B/P_R$-series video-data formatting unit 16, the encryption by using the key data DKCV is performed by, for example, the AES method for the $P_B/P_R$-series video data DCV in accordance with the timing control signal Td so as not to generate inhibited codes in order to generate encrypted $P_B/P_R$-series video data DCVE that is based on the $P_B/P_R$-series video data DCV and that includes no inhibited codes.

In the Y-series auxiliary-information-data formatting unit 17, there are cases in which the Y-series auxiliary information data DYA is to be encrypted or is not to be encrypted.

When the Y-series auxiliary information data DYA is to be encrypted, the encryption by using the key data DKYA is performed by, for example, the AES method for the Y-series auxiliary information data DYA in accordance with the timing control signal Te so as not to generate inhibited codes in order to generate encrypted Y-series auxiliary information data DYAE that is based on the Y-series auxiliary information data DYA and that includes no inhibited codes. Since the Y-series auxiliary information data DYA is digital audio information data in the example in FIG. 5, the encrypted Y-series auxiliary information data DYAE is encrypted digital audio information data. In the Y-series auxiliary-information-data formatting unit 17, the ADF (auxiliary data flag), the DID (data identification word), the DBN (data block number word), the DC (data count word), and the CS (checksum word) are added in this order to the generated encrypted Y-series auxiliary information data DYAE to form an encrypted Y-series auxiliary data packet PYAE, which starts from the ADF and which includes the encrypted Y-series auxiliary information data DYAE as an encrypted audio data packet.

The ADF or DID is replaced with the one different from the original. ADF or DID in the Y-series auxiliary-information-data formatting unit 17.

The ADF is replaced with the one different from the original ADF in the following manner.

The ADF has continuous three words arranged therein, which are a combination of [000h, 3FFh, and 3FFh] and to which the inhibited codes are set. When the Y-series auxiliary information data DYA is to be encrypted, the ADF is replaced with the one having continuous multiple words arranged therein, which are a combination (a second combination) different from the combination of [000h, 3FFh, and 3FFh] (a first combination) and to which the inhibited codes are set (the replaced ADF is hereinafter referred to as EADF). The second combination of the EADF, which is the ADF subjected to the replacement described above, is, for example, [000h, 3FEh, 3FEh], [003h, 3FCh, 000h], [000h, 3FEh, 3FEh, 3FEh].

Accordingly, the encrypted Y-series auxiliary data packet PYAE generated when the encryption is performed for the Y-series auxiliary information data DYA in the Y-series auxiliary-information-data formatting unit 17 has a three-word EADF, a one-word DID, a one-word DBN, a one-word DC, a 24-word encrypted Y-series auxiliary information data DYAE, and a one-word CS sequentially arranged, as shown by reference letter A in FIG. 6.

The DID is replaced with the one different from the original DID in the following manner.

The DID represents a type of the Y-series auxiliary information data and is set to a code other than the inhibited codes, set in advance in accordance with the type of the auxiliary information data. When the Y-series auxiliary information data DYA is to be encrypted, the DID is replaced with the one which is set in advance in accordance with the type of the auxiliary information data, which is different from a code (a first code) other than the inhibited codes, which is set corresponding to the first code, and to which a code (a second code) other than the inhibited codes is set (the replaced DID is hereinafter referred to as EDID). That is, the EDID resulting from the above replacement of the DID has the second code different from the original first code.

Accordingly, the encrypted Y-series auxiliary data packet PYAE generated when the encryption is performed for the Y-series auxiliary information data DYA in the Y-series auxiliary-information-data formatting unit 17 has a three-word ADF, the one-word EDID, a one-word DBN, a one-word DC, a 24-word encrypted Y-series auxiliary information data DYAE, and a one-word CS sequentially arranged, as shown by reference letter A in FIG. 7.

In contrast, when the Y-series auxiliary information data DYA is not to be encrypted, the ADF, the DID, the DBN, the DC, and the CS are added in this order to the Y-series auxiliary information data DYA to form a Y-series auxiliary data packet PYA, which starts from the ADF and which includes the Y-series auxiliary information data DYA, as an audio data packet. In this case, the ADF is not subjected to the replacement described above and has continuous three words arranged therein, which are the original combination of [000h, 3FFh, 3FFh] and to which the inhibited codes are set. The DID is also not subjected to the replacement described above and is set to a code which is set in advance in accordance with the type of the original auxiliary information data and to which a code other than the inhibited codes is set.

In the $P_B/P_R$-series auxiliary-information-data formatting unit 18, there are cases in which the $P_B/P_R$-series auxiliary information data DCA is to be encrypted or is not to be encrypted.

When the $P_B/P_R$-series auxiliary information data DCA is to be encrypted, the encryption by using the key data DKCA is performed by, for example, the AES method for the $P_B/P_R$-series auxiliary information data DCA in accordance with the timing control signal Tf so as not to generate inhibited codes in order to generate encrypted $P_B/P_R$-series auxiliary information data DCAE that is based on the $P_B/P_R$-series auxiliary information data DCA and that includes no inhibited codes. Since the $P_B/P_R$-series auxiliary information data DCA is digital audio information data in the example in FIG. 5, the encrypted $P_B/P_R$-series auxiliary information data DCAE is encrypted digital audio information data. In the $P_B/P_R$-series auxiliary-information-data formatting unit 18, the ADF, the DID, the DBN, the DC, and the CS are added in this order to the generated encrypted $P_B/P_R$-series auxiliary information data DCAE to form an encrypted $P_B/P_R$-series auxiliary data packet PCAE, which starts from the ADF and which includes the encrypted $P_B/P_R$-series auxiliary information data DCAE, as an encrypted audio data packet.

The ADF or DID is replaced with the one different from the original ADF or DID in the $P_B/P_R$-series auxiliary-information-data formatting unit 18.

When the ADF is to be replaced with the one different from the original ADF, the EADF subjected to the replacement described above is used instead of the ADF having continuous three words arranged therein, which are the original combination of [000h, 3FFh, 3FFh] and to which the inhibited codes are set, as in the encryption of the Y-series auxiliary information data DYA described above.

Accordingly, the encrypted $P_B/P_R$-series auxiliary data packet PCAE generated when the encryption is performed for the $P_B/P_R$-series auxiliary information data DCA in the $P_B/P_R$-series auxiliary-information-data formatting unit 18 has a three-word EADF, a one-word DID, a one-word DBN, a one-word DC, the 24-word encrypted $P_B/P_R$-series auxiliary information data DCAE, and a one-word CS sequentially arranged, as shown by reference letter B in FIG. 6.

When the DID is to be replaced with the one different from the original DID, the EDID subjected to the replacement described above is used instead of the DID, which is set in advance in accordance with the type of the original auxiliary information data and to which a code other than the inhibited codes is set, as in the encryption of the Y-series auxiliary information data DYA described above.

Accordingly, the encrypted $P_B/P_R$-series auxiliary data packet PCAE generated when the encryption is performed for the $P_B/P_R$-series auxiliary information data DCA in the $P_B/P_R$-series auxiliary-information-data formatting unit 18 has a three-word ADF, the one-word EDID, a one-word DBN, a one-word DC, a 24-word encrypted $P_B/P_R$-series auxiliary information data DCAE, and a one-word CS sequentially arranged, as shown by reference letter B in FIG. 7.

In contrast, when the $P_B/P_R$-series auxiliary information data DCA is not to be encrypted, the ADF, the DID, the DBN, the DC, and the CS are added in this order to the $P_B/P_R$-series auxiliary information data DCA to form a $P_B/P_R$-series auxiliary data packet PCA, which starts from the ADF and which includes the $P_B/P_R$-series auxiliary information data DCA, as an audio data packet. In this case, the ADF is not subjected to the replacement described above and has continuous three words arranged therein, which are the original combination of [000h, 3FFh, 3FFh] and to which the inhibited codes are set. The DID is also not subjected to the replacement described above and is set to a code which is set in advance in accordance with the type of the original auxiliary information data and to which a code other than the inhibited codes is set.

The encrypted Y-series video data DYVE from the Y-series video-data formatting unit 15, the encrypted $P_B/P_R$-series video data DCVE from the $P_B/P_R$-series video-data formatting unit 16, the encrypted Y-series auxiliary data packet PYAE or the Y-series auxiliary data packet PYA from the Y-series auxiliary-information-data formatting unit 17, and the encrypted $P_B/P_R$-series auxiliary data packet PCAE or the $P_B/P_R$-series auxiliary data packet PCA from the $P_B/P_R$-series auxiliary-information-data formatting unit 18 are supplied to a data transmitting unit 20. A timing control signal Tg is also supplied from the timing control signal generator 14 to the data transmitting unit 20.

The data transmitting unit 20 includes a data synthesizer 21 to which the encrypted Y-series video data DYVE, the encrypted $P_B/P_R$-series video data DCVE, the encrypted Y-series auxiliary data packet PYAE or the Y-series auxiliary data packet PYA, the encrypted $P_B/P_R$-series auxiliary data packet PCAE or the $P_B/P_R$-series auxiliary data packet PCA, and the timing control signal Tg are supplied. The data synthesizer 21 synthesizes the encrypted Y-series video data DYVE, the encrypted $P_B/P_R$-series video data DCVE, the encrypted Y-series auxiliary data packet PYAE or the Y-series auxiliary data packet PYA, and the encrypted $P_B/P_R$-series auxiliary data packet PCAE or the $P_B/P_R$-series auxiliary data packet PCA under the control of the timing control signal Tg, and the timing reference code data EAV, the line number data, the error detection code data, the timing reference code data SAV, etc., described above, are added to the synthesized result to form an encrypted HD signal DXP.

The encrypted HD signal DXP formed in the data synthesizer 21 is formed of an encrypted Y data sequence and an encrypted $P_B/P_R$ data sequence. In each line of the encrypted Y data sequence, the line blanking area including, for example, the timing reference code data EAV, the line number data, the error detection code data, the encrypted Y-series auxiliary data packet PYAE or the Y-series auxiliary data packet PYA, and the timing reference code data SAV is followed by the encrypted Y-series video data DYVE. In each line of the encrypted $P_B/P_R$ data sequence, the line blanking area including, for example, the timing reference code data EAV, the line number data, the error detection code data, the encrypted $P_B/P_R$-series auxiliary data packet PCAE or the $P_B/P_R$-series auxiliary data packet PCA, and the timing reference code data SAV is followed by the encrypted $P_B/P_R$-series video data DCVE.

A parallel-to-serial (P/S) converter 22 converts the encrypted HD signal DXP supplied from the data synthesizer 21 into serial data to generate encrypted serial data DXSD. A scramble processor 23 performs scrambling for the encrypted serial data DXSD to generate scrambled and encrypted serial data DXSC. A NRZI converter 24 performs non return to zero inverted (NRZI) conversion to generate an encrypted HD-SDI signal DXS. The encrypted HD-SDI signal DXS supplied from the NRZI converter 24 is supplied to a data transmission path 26 through a transmission drive 25 and is transmitted.

The data transmitting unit 20 including the data synthesizer 21, P/S converter 22, the scramble processor 23, the NRZI converter 24, and the transmission drive 25 transmits the encrypted Y-series video data DYVE supplied from the Y-series video-data formatting unit 15, the encrypted $P_B/P_R$-series video data DCVE supplied from the $P_B/P_R$-series video-data formatting unit 16, the encrypted Y-series auxiliary data packet PYAE or the Y-series auxiliary data packet PYA supplied from the Y-series auxiliary-information-data formatting unit 17, and the encrypted $P_B/P_R$-series auxiliary data packet PCAE or the $P_B/P_R$-series auxiliary data packet PCA supplied from the $P_B/P_R$-series auxiliary-information-data formatting unit 18.

FIG. 8 shows an example of the structure of the Y-series auxiliary-information-data formatting unit 17. In the example of the structure shown in FIG. 8, the Y-series auxiliary information data DYA is supplied to both an encryption processor 31 and a delay device 32. The key data DKYA is supplied to a key data converter 33. The timing control signal Te is supplied to a control signal generator 34. The control signal generator 34 transmits control signals TA, TB, TC, and TD having different functions in response to the timing control signal Te or in accordance with other setting conditions.

The control signal TA is supplied from the control signal generator 34 to the key data converter 33. The key data converter 33 transmits pseudo random number data DYYA formed based on the key data DKYA at a timing corresponding to the control signal TA and supplies the pseudo random number data DYYA to the encryption processor 31.

The encryption processor 31 performs the encryption by using the pseudo random number data DYYA supplied from the key data converter 33 for the Y-series auxiliary information data DYA to generate the encrypted Y-series auxiliary information data DYAE that is based on the Y-series auxiliary information data DYA and that includes no inhibited codes, and supplies the generated encrypted Y-series auxiliary information data DYAE to a data selector 35.

The delay device 32 delays the Y-series auxiliary information data DYA by a time corresponding to the time required for the encryption of the Y-series auxiliary information data DYA in the encryption processor 31, and supplies the delayed Y-series auxiliary information data DYA to the data selector 35.

The control signal TC is supplied from the control signal generator 34 to the data selector 35. The control signal TC selectively indicates whether the auxiliary information data is to be encrypted or not to be encrypted. The data selector 35 extracts the encrypted Y-series auxiliary information data DYAE supplied from the encryption processor 31 when the control signal TC indicates that the auxiliary information data is to be encrypted, and extracts the Y-series auxiliary information data DYA supplied from the delay device 32 when the control signal TC indicates that the auxiliary information data is not to be encrypted. The encrypted Y-series auxiliary information data DYAE or the Y-series auxiliary information data DYA selectively extracted by the data selector 35 is supplied to a data-packet generating section 36.

The data-packet generating section 36 supplies the encrypted Y-series auxiliary information data DYAE or the Y-series auxiliary information data DYA from the data selector 35 to a data selector 37. The control signal TD is supplied from the control signal generator 34 to the data selector 37. The control signal TD indicates a timing when the auxiliary information data is to be generated and a timing when a variety of code data required for forming the auxiliary data packet, other than the auxiliary information data, is to be generated, in the generation of the auxiliary data packet.

The data-packet generating section 36 includes a packet-code-data generator 38 transmitting the variety of code data ADF, DID, DBN, DC, and CS required for forming the auxiliary data packet as packet code data DPC. The control signals TB and TC are supplied from the control signal generator 34 to the packet-code-data generator 38.

The packet-code-data generator 38 transmits the ADF, DID, DBN, DC, and CS as the packet code data DPC at a timing corresponding to the control signal TB and supplies the packet code data DPC to the data selector 37. When the control signal TC indicates that the auxiliary information data is to be encrypted, the packet-code-data generator 38 is in a state in which the EADF subjected to the replacement described above is transmitted instead of the original ADF or is in a state in which the EDID subjected to the replacement described above is transmitted instead of the original DID. Whether the packet-code-data generator 38 is in the state in which the EADF is transmitted instead of the ADF or is in the state in which the EDID is transmitted instead of the DID is set in advance in the packet-code-data generator 38. In contrast, when the control signal TC indicates that the auxiliary information data is not to be encrypted, the packet-code-data generator 38 transmits the original ADF and DID.

The data selector 37 selects and extracts the packet code data DPC supplied from the packet-code-data generator 38 when the control signal TD indicates the timing when the variety of code data required for forming the auxiliary data packet, other than the auxiliary information data, is to be generated, and extracts the encrypted Y-series auxiliary information data DYAE or the Y-series auxiliary information data DYA supplied from the data selector 35 when the control signal TD indicates the timing when the auxiliary information data is to be generated. As a result, the encrypted Y-series auxiliary data packet PYAE having the EADF, the DID, the DBN, the DC, the encrypted Y-series auxiliary information data DYAE, and the CS arranged in this order or having the ADF, the EDID, the DBN, the DC, the encrypted Y-series auxiliary information data DYAE, and the CS arranged in this order, or the Y-series auxiliary data packet PYA having the ADF, the DID, the DBN, the DC, the Y-series auxiliary information data DYA, and the CS arranged in this order is output from the data-packet generating section 36.

An example of the structure of the $P_B/P_R$-series auxiliary-information-data formatting unit 18 is similar to the example of the structure of the Y-series auxiliary-information-data formatting unit 17 shown in FIG. 8. In the example of the structure of the $P_B/P_R$-series auxiliary-information-data formatting unit 18, the encrypted $P_B/P_R$-series auxiliary data packet PCAE having the EADF, the DID, the DBN, the DC, the encrypted $P_B/P_R$-series auxiliary information data DCAE, and the CS arranged in this order or having the ADF, the EDID, the DBN, the DC, the encrypted $P_B/P_R$-series auxiliary information data DCAE, and the CS arranged in this order, or the $P_B/P_R$-series auxiliary data packet PCA having the ADF, the DID, the DBN, the DC, the $P_B/P_R$-series auxiliary information data DCA, and the CS arranged in this order is output from a data-packet generating section corresponding to the data-packet generating section 36 shown in FIG. 8.

Figure 9:
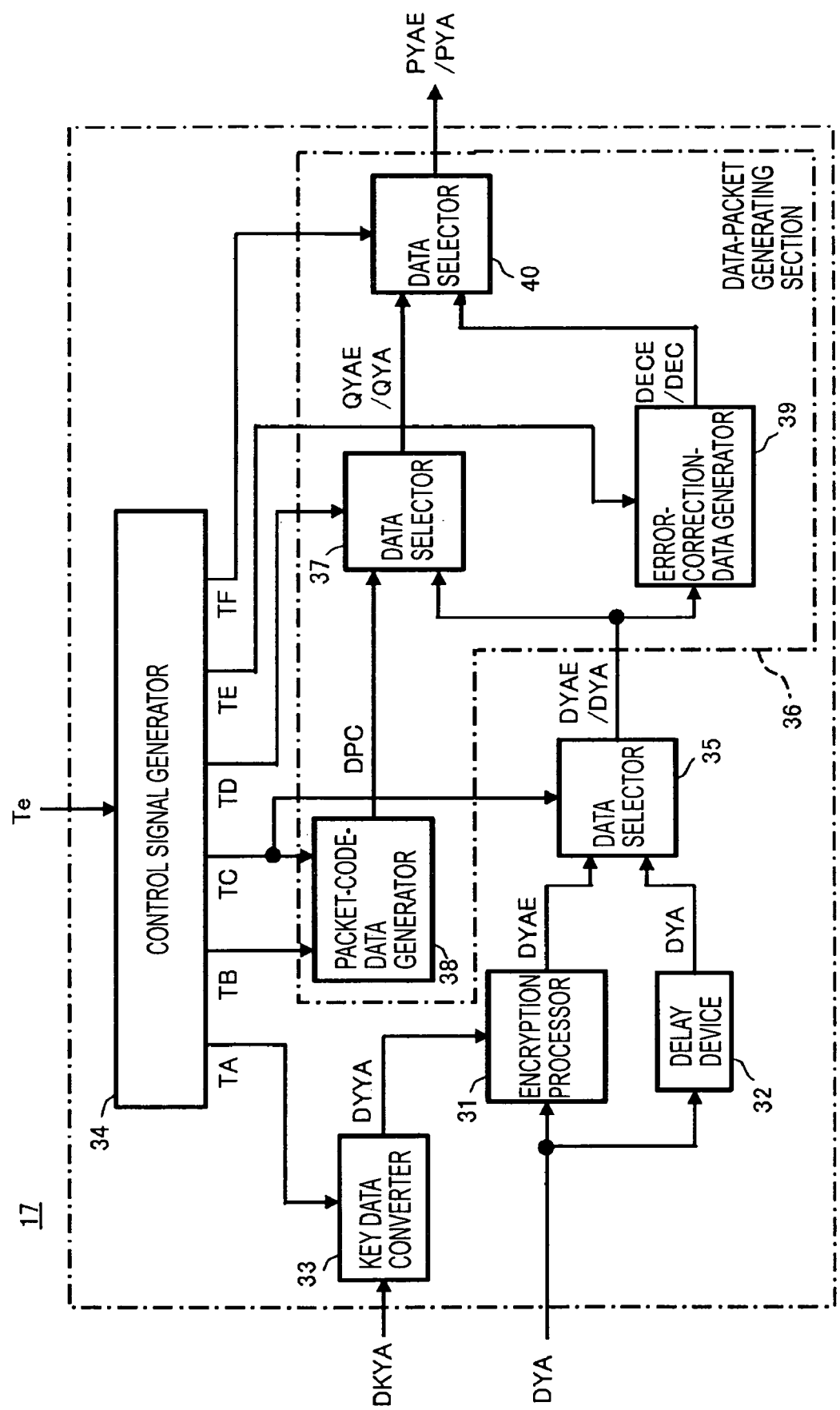
FIG. 9 is a block diagram showing another example of the structure of the Y-series auxiliary-information-data formatting unit shown in FIG. 5.

FIG. 9 shows another example of the structure of the Y-series auxiliary-information-data formatting unit 17. The example of the structure shown in FIG. 9 has many components similar to those in the example of the structure shown in FIG. 8, and the same reference numerals are used in FIG. 9 to identify the same components and data shown in FIG. 8. A duplicated description of such components and data is omitted herein.

In the example of the structure in FIG. 9, the control signal generator 34 transmits control signals TE and TF, in addition to the control signals TA, TB, TC, and TD. The data-packet generating section 36 includes an error-correction-data generator 39 and a data selector 40, in addition to the data selector 37 and the packet-code-data generator 38.

The data selector 37 in The data-packet generating section 36 selects and extracts the packet code data DPC supplied from the packet-code-data generator 38 when the control signal TD indicates the timing when the variety of code data required for forming the auxiliary data packet, other than the auxiliary information data, is to be generated, and extracts the encrypted Y-series auxiliary information data DYAE or the Y-series auxiliary information data DYA supplied from the data selector 35 when the control signal TD indicates the timing when the auxiliary information data is to be generated. As a result, encrypted word sequence data QYAE having the EADF, the DID, the DBN, the DC, the encrypted Y-series auxiliary information data DYAE, and the CS arranged in this order or having the ADF, the EDID, the DBN, the DC, the encrypted Y-series auxiliary information data DYAE, and the CS arranged in this order, or word sequence data QYA having the ADF, the DID, the DBN, the DC, the Y-series auxiliary information data DYA, and the CS arranged in this order is output from the data selector 37. The encrypted word sequence data QYAE or the word sequence data QYA output from the data selector 37 is supplied to the data selector 40.

The control signal TE is supplied from the control signal generator 34 to the error-correction-data generator 39 in the data-packet generating section 36. The control signal TE indicates that error correction data is to be generated. The control signal TF is supplied from the control signal generator 34 to the data selector 40 in the data-packet generating section 36. The control signal TF indicates a timing when the error correction data is inserted into the auxiliary data packet in the formation of the auxiliary data packet.

The encrypted Y-series auxiliary information data DYAE or the Y-series auxiliary information data DYA is supplied from the data selector 35 to the error-correction-data generator 39. When the encrypted Y-series auxiliary information data DYAE is supplied to the error-correction-data generator 39, the error-correction-data generator 39 generates error correction data DECE for the encrypted Y-series auxiliary information data DYAE in response to the control signal TE and supplies the formed error correction data DECE to the data selector 40. When the Y-series auxiliary information data DYA is supplied to the error-correction-data generator 39, the error-correction-data generator 39 generates error correction data DEC for the Y-series auxiliary information data DYA in response to the control signal TE and supplies the error correction data DEC to the data selector 40.

The data selector 40 selects and extracts the error correction data DECE or DEC supplied from the error-correction-data generator 39 when the control signal TF indicates a timing when the error correction data is inserted into the auxiliary data packet and, otherwise, extracts the encrypted word sequence data QYAE or the word sequence data QYA supplied from the data selector 37. As a result, the encrypted Y-series auxiliary data packet PYAE that is based on the encrypted word sequence data QYAE and the error correction data DECE and that has the EADF, the DID, the DBN, the DC, the encrypted Y-series auxiliary information data DYAE, the error correction data DECE, and the CS arranged in this order or has the ADF, the EDID, the DBN, the DC, the encrypted Y-series auxiliary information data DYAE, the error correction data DECE, and the CS arranged in this order, or the Y-series auxiliary data packet PYA that is based on the word sequence data QYA and the error correction data DEC and that has the ADF, the DID, the DBN, the DC, the Y-series auxiliary information data DYA, the error correction data DEC, and the CS arranged in this order is output from the data-packet generating section 36.

Another example of the structure of the $P_B/P_R$-series auxiliary-information-data formatting unit 18 is similar to the other example of the structure of the Y-series auxiliary-information-data formatting unit 17 shown in FIG. 9. In the other example of the structure of the $P_B/P_R$-series auxiliary-information-data formatting unit 18, the encrypted $P_B/P_R$-series auxiliary data packet PCAE having the EADF, the DID, the DBN, the DC, the encrypted $P_B/P_R$-series auxiliary information data DCAE, the error correction data DECE, and the CS arranged in this order or having the ADF, the EDID, the DBN, the DC, the encrypted $P_B/P_R$-series auxiliary information data DCAE, the error correction data DECE, and the CS arranged in this order, or the $P_B/P_R$-series auxiliary data packet PCA having the ADF, the DID, the DBN, the DC, the $P_B/P_R$-series auxiliary information data DCA, the error correction data DEC, and the CS arranged in this order is output from a data-packet generating section corresponding to the data-packet generating section 36 shown in FIG. 9.

When the Y-series auxiliary-information-data formatting unit 17 has the structure shown in FIG. 9 and the $P_B/P_R$-series auxiliary-information-data formatting unit 18 has the structure similar to the structure shown in FIG. 9, the encrypted Y-series auxiliary data packet PYAE includes the error correction data DECE formed for the encrypted Y-series auxiliary information data DYAE, and the $P_B/P_R$-series auxiliary data packet PCA includes the error correction data DECE formed for the encrypted $P_B/P_R$-series auxiliary information data DCAE. Accordingly, a reduction in performance of the error correction, caused by the encryption, in the encrypted Y-series auxiliary information data DYAE and the encrypted $P_B/P_R$-series auxiliary information data DCAE can be avoided.

Figure 10:
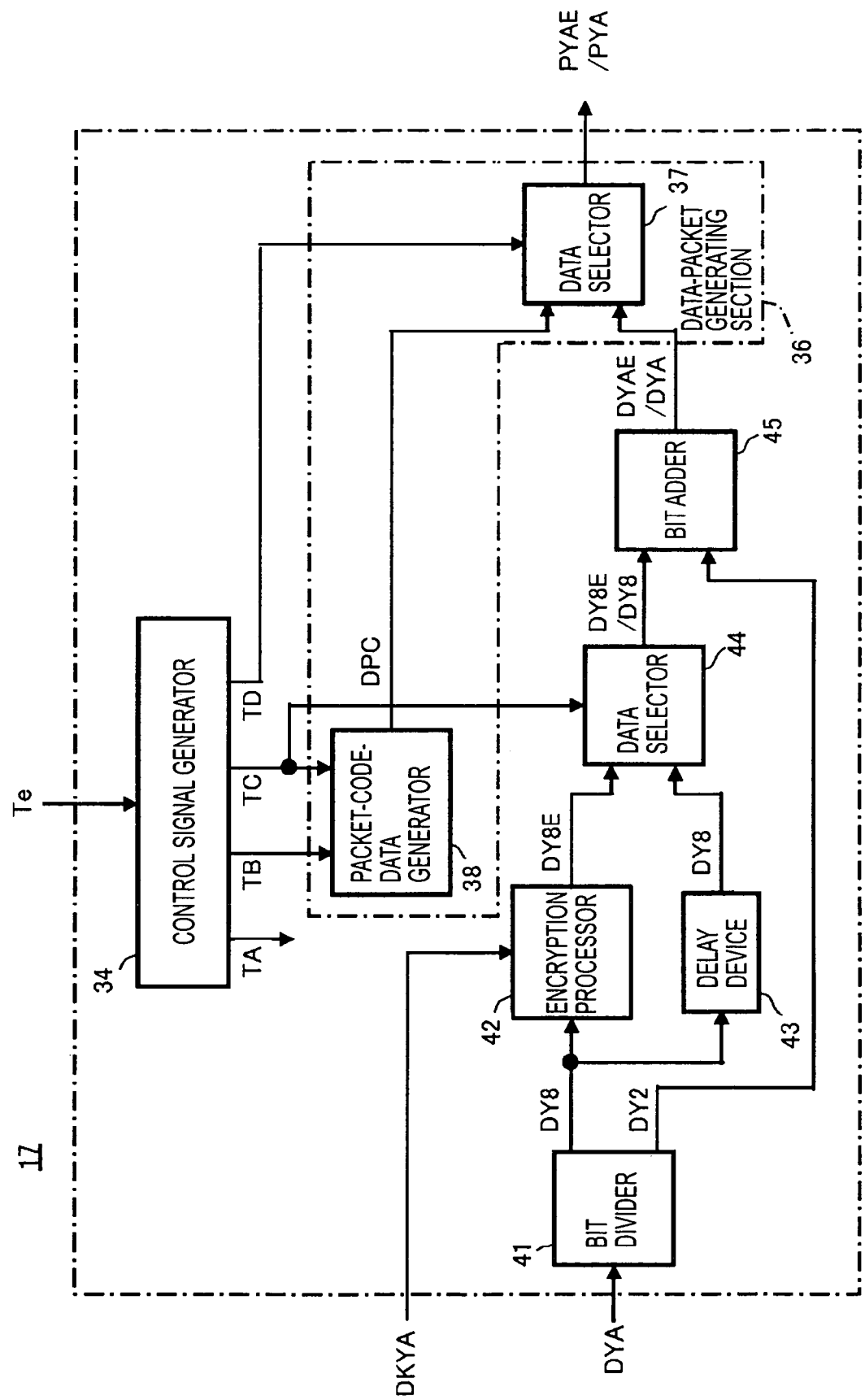
FIG. 10 is a block diagram showing yet another example of the structure of the Y-series auxiliary-information-data formatting unit shown in FIG. 5.

FIG. 10 shows yet another example of the structure of the Y-series auxiliary-information-data formatting unit 17. Part of the example of the structure shown in FIG. 10 is similar to the example of the structure shown in FIG. 8, and the same reference numerals are used in FIG. 10 to identify the same components and data shown in FIG. 8. A duplicated description of such components and data is omitted herein.

In the example of the structure shown in FIG. 10, the Y-series auxiliary information data DYA is digital audio information data. In each word in the digital audio information data, eight bits excluding the higher two bits among the 10 bits serve as the information bits, as described above, and the higher two bits are set to "10" or "01".

The Y-series auxiliary information data DYA, which is digital audio information data, is supplied to a bit divider 41. The bit divider 41 performs bit division in which the 10 bits in each word are divided into the lower eight bits and the higher two bits ("10" or "01") for the Y-series auxiliary information data DYA to form eight-bit string data DY8 including the eight bits resulting from the division of each word in the Y-series auxiliary information data DYA and two-bit string data DY2 including the two bits resulting from the division of each word of the Y-series auxiliary information data DYA. The eight-bit string data DY8 formed in the bit divider 41 is supplied to both an encryption processor 42 and a delay device 43, and the two-bit string data DY2 formed in the bit divider 41 is supplied to a bit adder 45.

The encryption processor 42 includes, for example, a bitwise exclusive OR circuit. The key data DKYA is supplied to the encryption processor 42, in addition to the eight-bit string data DY8. The encryption processor 42 performs encryption by using the key data DKYA for the eight-bit string data DY8 to form encrypted 8-bit string data DY8E, and supplies the encrypted 8-bit string data DY8E to a data selector 44.

The delay device 43 delays the eight-bit string data DY8 by a time corresponding to the time required for the encryption of the eight-bit string data DY8 in the encryption processor 42, and supplies the delayed eight-bit string data DY8 to the data selector 44.

The control signal TC is supplied from the control signal generator 34 to the data selector 44. The data selector 44 extracts the encrypted 8-bit string data DY8E supplied from the encryption processor 42 when the control signal TC indicates that the auxiliary information data is to be encrypted, and extracts the eight-bit string data DY8 supplied from the encryption processor 42 when the control signal TC indicates that the auxiliary information data is not to be encrypted. The encrypted 8-bit string data DY8E or the eight-bit string data DY8 selectively extracted by the data selector 44 is supplied to the bit adder 45.

The bit adder 45 adds the two bits, that is, X"10" or "01", in the two-bit string data DY2 supplied from the bit divider 41 to the eight bits in the encrypted 8-bit string data DY8E or to the eight-bit string data DY8 supplied from the data selector 44 to generate a 10-bit word. The inhibited codes are not set to the 10-bit word structured in the above manner because the higher two bits are set to "10" or "01". The encrypted Y-series auxiliary information data DYAE or Y-series auxiliary information data DYA, which is generated in the bit adder 45, which includes the 10-bit words, and to which the inhibited codes are not set, is supplied to a data-packet generating section 36.

The data-packet generating section 36 corresponds to the data-packet generating section 36 in the example of the structure shown in FIG. 8. As in the example of the structure in FIG. 8, the encrypted Y-series auxiliary data packet PYAE or Y-series auxiliary data packet PYA is output from the data-packet generating section 36.

Yet another example of the structure of the $P_B/P_R$-series auxiliary-information-data formatting unit 18 is similar to the other example of the structure of the Y-series auxiliary-information-data formatting unit 17 shown in FIG. 10. In the other example of the structure of the $P_B/P_R$-series auxiliary-information-data formatting unit 18, the encrypted $P_B/P_R$-series auxiliary data packet PCAE or $P_B/P_R$-series auxiliary data packet PCA is output from a data-packet generating section corresponding to the data-packet generating section 36 in FIG. 10.

Figure 11:
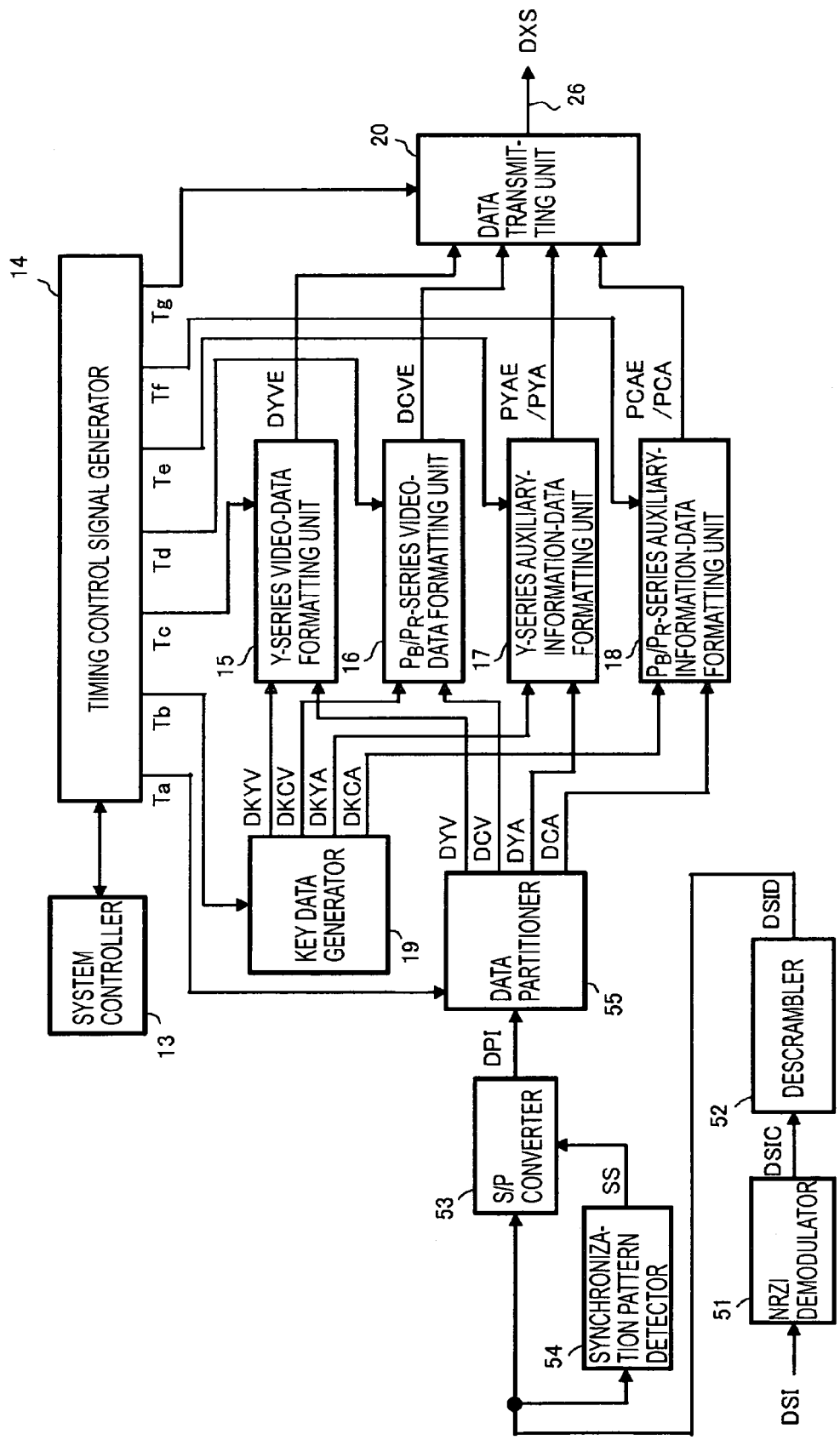
FIG. 11 is a block diagram showing another example of the data transmission apparatus according to the invention described in any of Claims 7 to 12 in the claims of this application, implementing an example of the data transmission method according to the invention described in any of Claims 1 to 6 in the claims of this application.

FIG. 11 shows another example of the data transmission apparatus according to the invention described in any of Claims 7 to 12 in the claims of this application, implementing another example of the data transmission method according to the invention described in any of Claims 1 to 6 in the claims of this application.

The example in FIG. 11 has many components similar to those in the example shown in FIG. 5, and the same reference numerals are used in FIG. 11 to identify the same components and data shown in FIG. 5. A duplicated description of such components and data is omitted herein.

In the example shown in FIG. 11, an HD-SDI signal DSI, which is an input signal, is supplied to a NRZI demodulator 51. The NRZI demodulator 51 performs NRZI demodulation for the HD-SDI signal DSI to generate scrambled serial data DSIC and supplies the scrambled serial data DSIC to a descrambler 52.

The descrambler 52 performs descrambling for the scrambled serial data DSIC to generated descrambled serial data DSID. The descrambled serial data DSID is supplied from the descrambler 52 to both a serial-to-parallel (S/P) converter 53 and a synchronization pattern detector 54.

The synchronization pattern detector 54 detects a synchronization pattern, which is a serial sequence of the inhibited codes, for example, [3FFh, 000h, 000h], in the serial data DSID to generate a detection output signal SS of the synchronization pattern, and supplies the detection output signal SS to the S/P converter 53. The S/P converter 53 performs S/P conversion for the serial data DSID by using the detection output signal SS supplied from the synchronization pattern detector 54 to generate an HD signal DPI formed of a sequence of 10-bit words, based on the serial data DSID. The HD signal DPI generated in the S/P converter 53 is supplied to a data partitioner 55.

The data partitioner 55 performs word partition for the HD signal DPI to separate Y-series video data, $P_B/P_R$-series video data, Y-series auxiliary information data, and $P_B/P_R$-series auxiliary information data included in the HD signal DPI from each other and to extract the separated data and packets. The data partitioner 55 transmits the Y-series video data DYV, the $P_B/P_R$-series video data DCV, the Y-series auxiliary information data DYA, and the $P_B/P_R$-series auxiliary information data DCA. The Y-series video data DYV, the $P_B/P_R$-series video data DCV, the Y-series auxiliary information data DYA, and the $P_B/P_R$-series auxiliary information data DCA are supplied to a Y-series video-data formatting unit 15, a $P_B/P_R$-series video-data formatting unit 16, a Y-series auxiliary-information-data formatting unit 17, and a $P_B/P_R$-series auxiliary-information-data formatting unit 18, respectively.

Other structures and the operation in the example shown in FIG. 11 are similar to those in the example shown in FIG. 8. The encrypted HD-SDI signal DXS is supplied from a data transmitting unit 20 to a data transmission path 26 and is transmitted.

Figure 12:
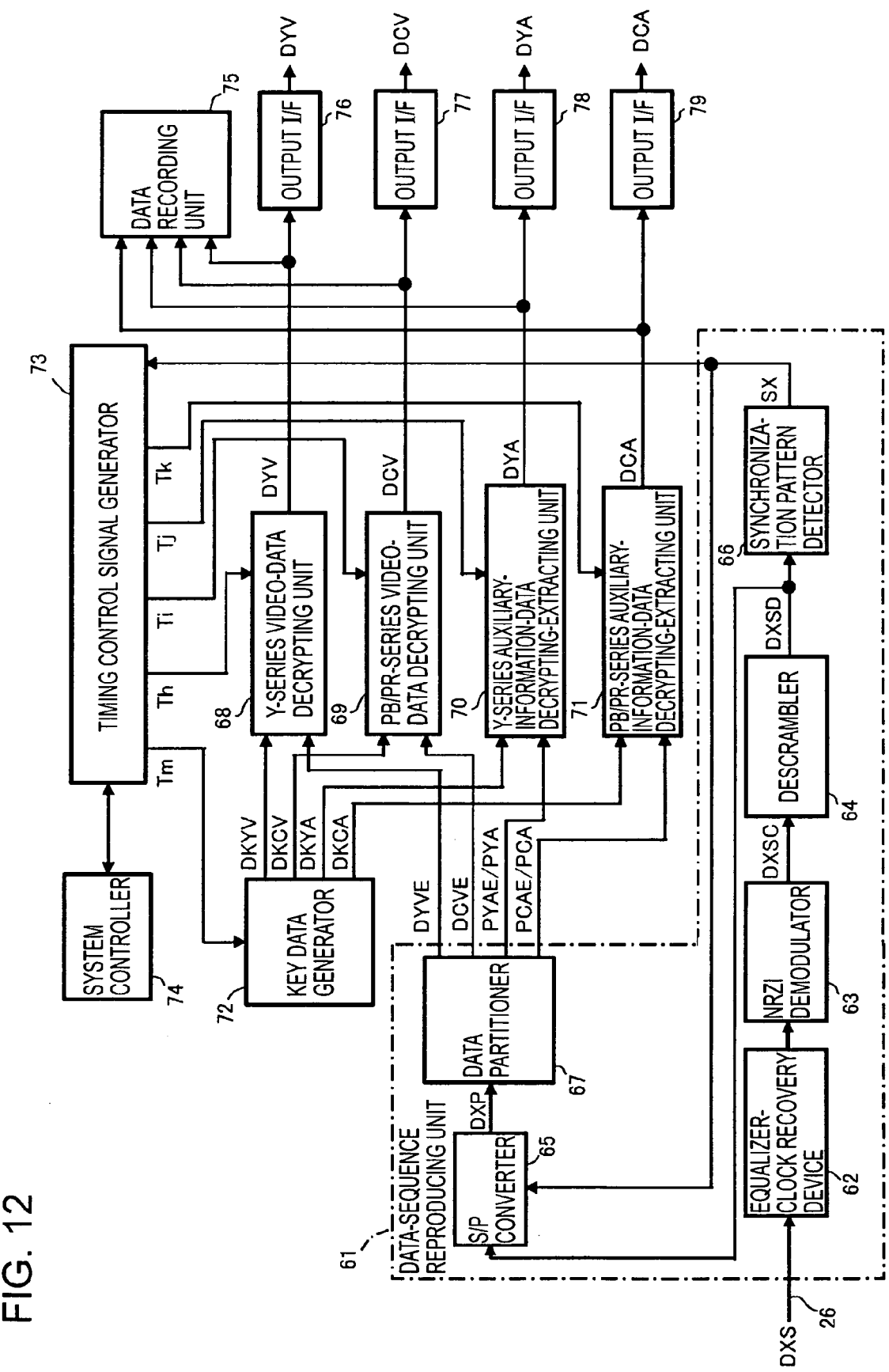
FIG. 12 is a block diagram showing an example of a data reception apparatus according to the invention described in any of Claims 19 to 24 in the claims of this application, implementing an example of a data reception method according to the invention described in any of Claims 13 to 18 in the claims of this application.

FIG. 12 shows an example of a data reception apparatus according to the invention described in any of Claims 19 to 24 in the claims of this application, implementing an example of a data reception method according to the invention described in any of Claims 13 to 18 in the claims of this application.

The example shown in FIG. 12 receives the encrypted HD-SDI signal DXS transmitted from the example of the data transmission apparatus according to the invention described in any of Claims 7 to 12 in the claim of this application, shown in FIG. 5 or FIG. 11.

In the example shown in FIG. 12, the encrypted HD-SDI signal DXS transmitted through the data transmission path 26 is supplied to a data-sequence reproducing unit 61. In the data-sequence reproducing unit 61, the encrypted HD-SDI signal DXS is supplied to an NRZI demodulator 63 through an equalizer-clock recovery device 62.

The equalizer-clock recovery device 62 performs equalization for compensating a variation in level caused in the transmission through the data transmission path 26 for the encrypted HD-SDI signal DXS, and recovers a clock signal in the encrypted HD-SDI signal DXS. The NRZI demodulator 63 performs the NRZI modulation for the encrypted HD-SDI signal DXS to generate scrambled serial data DXSC, and supplies the scrambled serial data DXSC to a descrambler 64.

The descrambler 64 performs descrambling for the scrambled serial data DXSC to generated descrambled serial data DXSD. The descrambled serial data DXSD is supplied from the descrambler 64 to both an S/P converter 65 and to a synchronization pattern detector 66.

The synchronization pattern detector 66 detects a synchronization pattern, which is a serial sequence of the inhibited codes, for example, [3FFh, 000h, 000h], in the serial data DXSD, to generate a detection output signal SX of the synchronization pattern, and supplies the detection output signal Sx to the S/P converter 65. The S/P converter 65 performs the S/P conversion for the serial data DXSD by using the detection output signal SX supplied from the synchronization pattern detector 66 to generate an encrypted HD signal DXP formed of a sequence of 10-bit words, based on the serial data DXSD. The encrypted HD signal DXP generated in the S/P converter 65 is supplied to a data partitioner 67.

The data partitioner 67 performs word partition for the encrypted HD signal DXP to separate the encrypted Y-series video data DYVE, the encrypted $P_B/P_R$-series video data DCVE, the encrypted Y-series auxiliary data packet PYAE or the Y-series auxiliary data packet PYA, and the encrypted $P_B/P_R$-series auxiliary data packet PCAE or the $P_B/P_R$-series auxiliary data packet PCA included in the encrypted HD signal DXP from each other and to extract the separated data and packets. The encrypted Y-series video data DYVE, the encrypted $P_B/P_R$-series video data DCVE, the encrypted Y-series auxiliary data packet PYAE or the Y-series auxiliary data packet PYA, and the encrypted $P_B/P_R$-series auxiliary data packet PCAE or the $P_B/P_R$-series auxiliary data packet PCA, which are supplied from the data partitioner 67, are transmitted from the data-sequence reproducing unit 61 to a Y-series video-data decrypting unit 68, a $P_B/P_R$-series video-data decrypting unit 69, a Y-series auxiliary-information-data decrypting-extracting unit 70, and a $P_B/P_R$-series auxiliary-information-data decrypting-extracting unit 71, respectively.

Key data DKYV used for decrypting the Y-series video data, key data DKCV used for decrypting the $P_B/P_R$-series video data, key data DKYA used for decrypting the Y-series auxiliary information data, and key data DKCA used for decrypting the $P_B/P_R$-series auxiliary information data are also supplied from a key data generator 72 to the Y-series video-data decrypting unit 68, the $P_B/P_R$-series video-data decrypting unit 69, the Y-series auxiliary-information-data decrypting-extracting unit 70, and the $P_B/P_R$-series auxiliary-information-data decrypting-extracting unit 71, respectively. Timing control signals Th, Ti, Tj, and Tk are also supplied from a timing control signal generator 73 to the -series video-data decrypting unit 68, the $P_B/P_R$-series video-data decrypting unit 69, the Y-series auxiliary-information-data decrypting-extracting unit 70, and the $P_B/P_R$-series auxiliary-information-data decrypting-extracting unit 71, respectively.

The timing control signal generator 73, to which the detection output signal SX is supplied from the synchronization pattern detector 66 in the data-sequence reproducing unit 61, is controlled by a system controller 74 controlling the entire data reception apparatus. The key data generator 72 transmits the key data DKYV used for decrypting the Y-series video data, the key data DKCV used for decrypting the $P_B/P_R$-series video data, the key data DKYA used for decrypting the Y-series auxiliary information data, and the key data DKCA used for decrypting the $P_B/P_R$-series auxiliary information data in accordance with a timing control signal Tm supplied from the timing control signal generator 73.

The Y-series video-data decrypting unit 68 performs decryption by using the key data DKYV for the encrypted Y-series video data DYVE in accordance with the timing control signal Th to reproduce the Y-series video data DYV, which is based on the encrypted Y-series video data DYVE and which includes no inhibited codes. Similarly, the $P_B/P_R$-series video-data decrypting unit 69 performs the decryption by using the key data DKCV for the encrypted $P_B/P_R$-series video data DCVE in accordance with the timing control signal Ti to reproduce the $P_B/P_R$-series video data DCV, which is based on the encrypted $P_B/P_R$-series video data DCVE and which includes no inhibited codes.

The Y-series auxiliary-information-data decrypting-extracting unit 70 performs the decryption by using the key data DKYA for the encrypted Y-series auxiliary information data DYAE included in the encrypted Y-series auxiliary data packet PYAE in accordance with the timing control signal Tj to selectively enter a state in which the Y-series auxiliary information data DYA, which is based on the encrypted Y-series auxiliary information data DYAE and which includes no inhibited codes, is reproduced or a state in which the Y-series auxiliary information data DYA is extracted from the Y-series auxiliary data packet PYA. Similarly, the $P_B/P_R$-series auxiliary-information-data decrypting-extracting unit 71 performs the decryption by using the key data DKCA for the encrypted $P_B/P_R$-series auxiliary information data DCAE included in the encrypted $P_B/P_R$-series auxiliary data packet PCAE in accordance with the timing control signal Tk to selectively enter a state in which the $P_B/P_R$-series auxiliary information data DCA, which is based on the encrypted $P_B/P_R$-series auxiliary information data DCAE and which includes no inhibited codes, is reproduced or a state in which $P_B/P_R$-series auxiliary information data DCA is extracted from the $P_B/P_R$-series auxiliary data packet PCA.

As a result, the Y-series video data DYV is output from the Y-series video-data decrypting unit 68, the $P_B/P_R$-series video data DCV is output from the $P_B/P_R$-series video-data decrypting unit 69, the Y-series auxiliary information data DYA is output from the Y-series auxiliary-information-data decrypting-extracting unit 70, and the $P_B/P_R$-series auxiliary information data DCA is output from the $P_B/P_R$-series auxiliary-information-data decrypting-extracting unit 71. The Y-series video data DYV output from the Y-series video-data decrypting unit 68 is supplied to a data recording unit 75, and the supplied Y-series video data DYV is recorded in the data recording unit 75 and is transmitted through an output I/F 76. The $P_B/P_R$-series video data DCV output from the $P_B/P_R$-series video-data decrypting unit 69 is supplied to the data recording unit 75, and the supplied $P_B/P_R$-series video data DCV is recorded in the data recording unit 75 and is transmitted through an output I/F 77. The Y-series auxiliary information data DYA output from the Y-series auxiliary-information-data decrypting-extracting unit 70 is supplied to the data recording unit 75, and the supplied Y-series auxiliary information data DYA is recorded in the data recording unit 75 and is transmitted through an output I/F 78. The $P_B/P_R$-series auxiliary information data DCA output from the $P_B/P_R$-series auxiliary-information-data decrypting-extracting unit 71 is supplied to the data recording unit 75, and the supplied $P_B/P_R$-series auxiliary information data DCA is stored in the data recording unit 75 and is transmitted through an output I/F 79.

Figure 13:
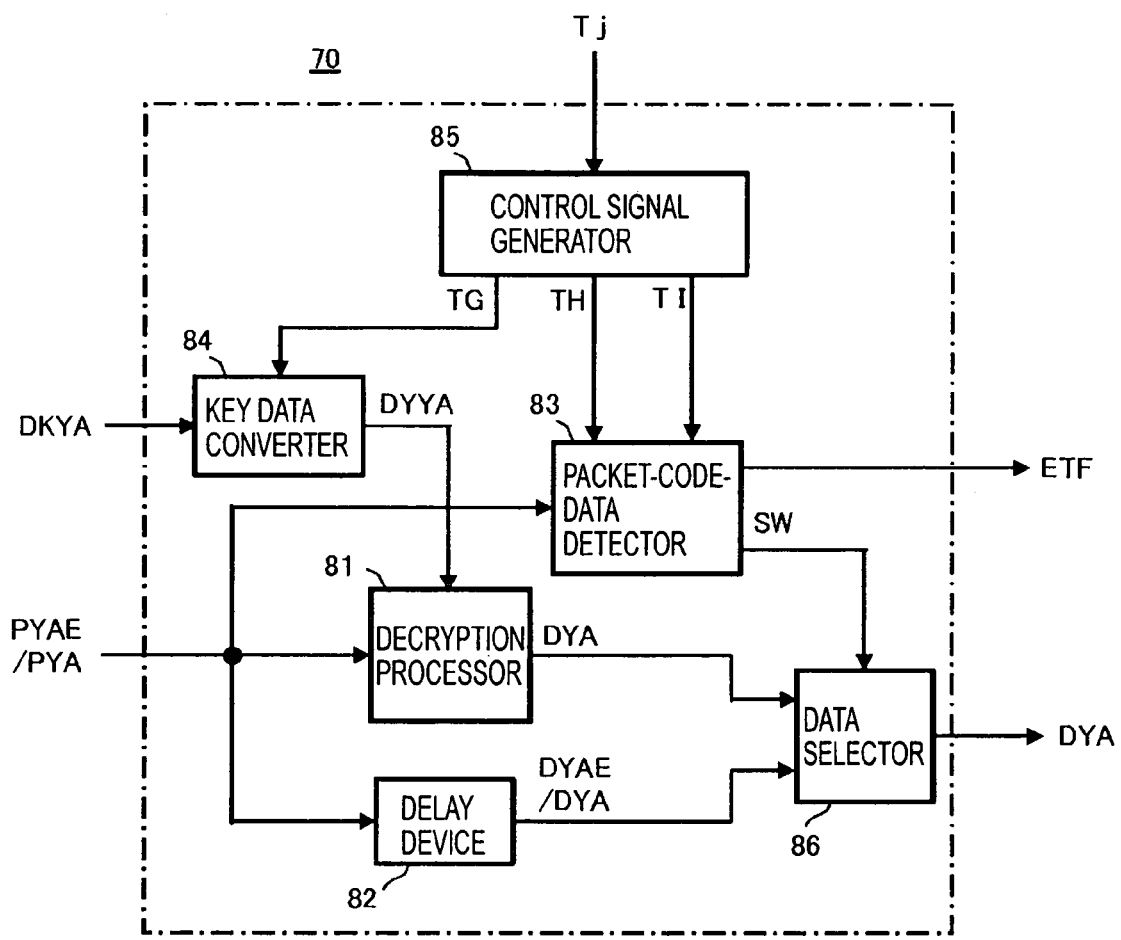
FIG. 13 is a block diagram showing an example of the structure of a Y-series auxiliary-information-data decoding-extracting unit shown in FIG. 12.

FIG. 13 shows an example of the structure of the Y-series auxiliary-information-data decrypting-extracting unit 70. In the example of the structure shown in FIG. 13, the encrypted Y-series auxiliary data packet PYAE or the Y-series auxiliary data packet PYA is supplied to a decryption processor 81, a delay device 82, and a packet-code-data detector 83. The key data DKYA is supplied to a key data converter 84. The timing control signal Tj is supplied to a control signal generator 85 that transmits control signals TG, TH, and YI having different functions in accordance with the timing control signal Tj or in accordance with other setting conditions.

The control signal TG is supplied from the control signal generator 85 to the key data converter 84. The key data converter 84 transmits pseudo random number data DYYA formed based on the key data DKYA at a timing corresponding to the control signal TG, and supplies the pseudo random number data DYYA to the decryption processor 81.

When the encrypted Y-series auxiliary data packet PYAE is supplied to the decryption processor 81, the delay device 82, and the packet-code-data detector 83 in this structure, the following operation is carried out.

The decryption processor 81 performs the decryption by using the pseudo random number data DYYA supplied from the key data converter 84 for the encrypted Y-series auxiliary information data DYAE included in the encrypted Y-series auxiliary data packet PYAE to reproduce the Y-series auxiliary information data DYA, which is based on the encrypted Y-series auxiliary information data DYAE and which includes no inhibited codes, and supplies the Y-series auxiliary information data DYA to a data selector 86.

The delay device 82 delays the encrypted Y-series auxiliary information data DYAE included in the encrypted Y-series auxiliary data packet PYAE, and supplies the delayed encrypted Y-series auxiliary information data DYAE to the data selector 86.

The packet-code-data detector 83 detects the EADF, which is included in the encrypted Y-series auxiliary data packet PYAE and with which the original ADF is replaced, or the EDID with which the original DID is replaced. Whether the EADF or the EDID is detected is set in advance.

The control signals TH and TI are supplied from the control signal generator 85 to the packet-code-data detector 83. The control signal TH indicates a timing of the ADF or DID in the Y-series auxiliary data packet. Whether the control signal TH indicates a timing of the ADF or a timing of the DID is determined in accordance with whether the packet-code-data detector 83 is set so as to detect the EADF or is set so as to detect the EDID. The control signal TI indicates that the EADF with which the original ADF is replaced is to be detected or that the EDID with which the original DID is replaced is to be detected. Whether the control signal TI indicates the detection of the EADF or the detection of the EDID is determined in accordance with whether the packet-code-data detector 83 is set so as to detect the EADF or is set so as to detect the EDID.

The packet-code-data detector 83 detects the EADF or EDID included in the encrypted Y-series auxiliary data packet PYAE in accordance with the indication in the control signal TI at the timing specified by the control signal TH, transmits a detection output signal SW corresponding to the detection of the EADF or EDID, and supplies the detection output signal SW to the data selector 86. The packet-code-data detector 83 also transmits a data available period flag ETF representing a period during which the encrypted Y-series auxiliary information data DYAE is available, based on code data other than the EADF or EDID, included in the encrypted Y-series auxiliary data packet PYAE.

The data selector 86, to which the detection output signal SW is supplied from the packet-code-data detector 83, extracts the Y-series auxiliary information data DYA from the decryption processor 81 in response to the detection output signal SW, and outputs the Y-series auxiliary information data DYA.

When the Y-series auxiliary data packet PYA is supplied to the decryption processor 81, the delay device 82, and the packet-code-data detector 83, the following operation is carried out.

The decryption processor 81 performs the decryption by using the pseudo random number data DYYA supplied from the key data converter 84 for the Y-series auxiliary information data DYA included in Y-series auxiliary data packet PYA. However, no meaningful data is reproduced in this case.

The delay device 82 delays the Y-series auxiliary information data DYA included in the Y-series auxiliary data packet PYA, and supplies the delayed Y-series auxiliary information data DYA to the data selector 86.

The packet-code-data detector 83 detects the ADF or DID included in Y-series auxiliary data packet PYA Whether the ADF or the DID is detected is set in advance.

The control signals TH and TI are supplied from the control signal generator 85 to the packet-code-data detector 83. The control signal TH indicates a timing of the ADF or DID in the Y-series auxiliary data packet. Whether the control signal TH indicates a timing of the ADF or a timing of the DID is determined in accordance with whether the packet-code-data detector 83 is set so as to detect the ADF or is set so as to detect the DID. The control signal TI indicates that the ADF is to be detected or that the DID is to be detected. Whether the control signal TI indicates the detection of the ADF or the detection of the DID is determined in accordance with whether the packet-code-data detector 83 is set so as to detect the ADF or is set so as to detect the DID.

The packet-code-data detector 83 detects the ADF or DID included in the Y-series auxiliary data packet PYA in accordance with the indication in the control signal TI at the timing specified by the control signal TH, transmits the detection output signal SW corresponding to the detection of the ADF or DID, and supplies the detection output signal SW to the data selector 86. The packet-code-data detector 83 also transmits the data available period flag ETF representing a period during which the Y-series auxiliary information data DYA is available, based on code data other than the ADF or DID, included in the Y-series auxiliary data packet PYA.

The data selector 86, to which the detection output signal SW is supplied from the packet-code-data detector 83, extracts the Y-series auxiliary information data DYA from the delay device 82 in response to the detection output signal SW, and outputs the Y-series auxiliary information data DYA.

The Y-series auxiliary information data DYA is output from the data selector 86 in the manner described above.

In the example of the structure shown in FIG. 13, the decryption processor 81 may include, for example, a bit-wise exclusive OR circuit when the encrypted Y-series auxiliary information data DYAE included in the encrypted Y-series auxiliary data packet PYAE is encrypted digital audio information data or the Y-series auxiliary information data DYA included in the Y-series auxiliary data packet PYA is digital audio information data.

An example of the structure of the $PP_B/P_R$-series auxiliary-information-data decrypting-extracting unit 71 is similar to the example of the structure of the Y-series auxiliary-information-data decrypting-extracting unit 70 shown in FIG. 13. In the example of the structure of the $P_B/P_R$-series auxiliary-information-data decrypting-extracting unit 71, the $P_B/P_R$-series auxiliary information data DCA is output from a data selector corresponding to the data selector 86 in FIG. 13.

Figure 14:
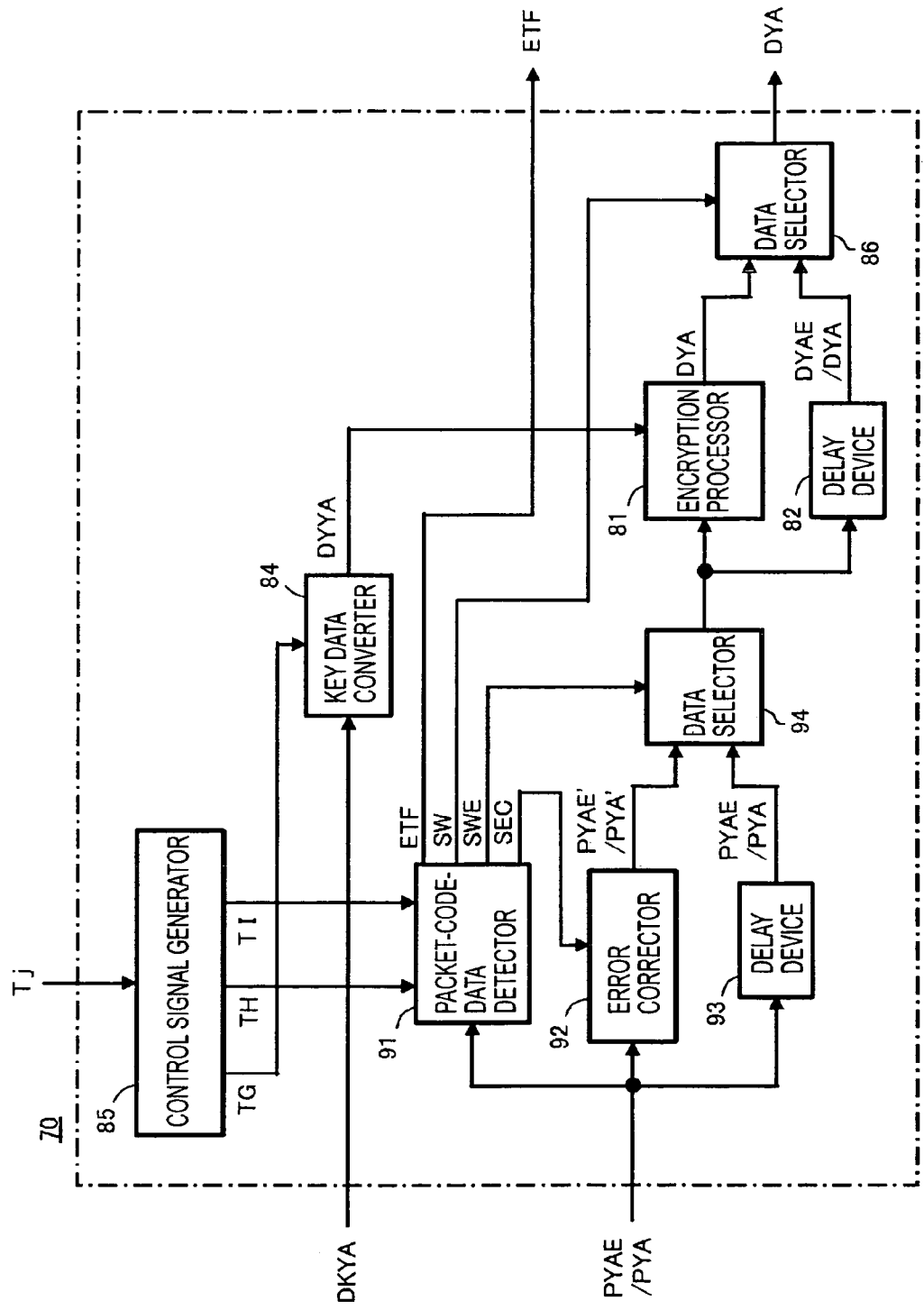
FIG. 14 is a block diagram showing another example of the structure of the Y-series auxiliary-information-data decoding-extracting unit shown in FIG. 12.

FIG. 14 shows another example of the structure of the Y-series auxiliary-information-data decrypting-extracting unit 70. The example shown in FIG. 14 has many components similar to those in the example shown in FIG. 13, and the same reference numerals are used in FIG. 14 to identify the same components and data shown in FIG. 13. A duplicated description of such components and data is omitted herein.

In the example of the structure shown in FIG. 14, the encrypted Y-series auxiliary data packet PYAE or the Y-series auxiliary data packet PYA is supplied to a packet-code-data detector 91, an error corrector 92, and a delay device 93. Control signals TH and TI are also supplied from the control signal generator 85 to the packet-code-data detector 91.

The packet-code-data detector 91 detects whether the encrypted Y-series auxiliary data packet PYAE or the Y-series auxiliary data packet PYA has the error correction data, for example, the error correction data DECE or DEC generated by the error-correction-data generator 39 in FIG. 9, inserted thereinto or the encrypted Y-series auxiliary data packet PYAE or the Y-series auxiliary data packet PYA has no error correction data inserted thereinto. When the encrypted Y-series auxiliary data packet PYAE or the Y-series auxiliary data packet PYA has the error correction data inserted thereinto, the packet-code-data detector 91 supplies an error correction control signal SEC to the error corrector 92.

The error corrector 92 performs error correction by using the error correction data inserted into the encrypted Y-series auxiliary-data packet PYAE or the Y-series auxiliary data packet PYA for the encrypted Y-series auxiliary information data DYAE or the Y-series auxiliary information data DYA included in the encrypted Y-series auxiliary data packet PYAE or the Y-series auxiliary data packet PYA having the error correction data inserted thereinto in response to the error correction control signal SEC. The error correction in the error corrector 92 forms an encrypted Y-series auxiliary data packet PYAE' or a Y-series auxiliary data packet PYA' including the encrypted Y-series auxiliary information data DYAE or the Y-series auxiliary information data DYA subjected to the error correction, and the encrypted Y-series auxiliary data packet PYAE' or the Y-series auxiliary data packet PYA' is supplied to a data selector 94.

The delay device 93 delays the encrypted Y-series auxiliary data packet PYAE or the Y-series auxiliary data packet PYA by a time corresponding to the time required for the error correction of the encrypted Y-series auxiliary information data DYAE or the Y-series auxiliary information data DYA included in the encrypted Y-series auxiliary data packet PYAE or the Y-series auxiliary data packet PYA in the error corrector 92, and supplies the delayed encrypted Y-series auxiliary data packet PYAE or Y-series auxiliary data packet PYA to the data selector 94.

The packet-code-data detector 91 supplies, to the data selector 94, a control signal SWE indicating that the encrypted Y-series auxiliary data packet PYAE or the Y-series auxiliary data packet PYA has the error correction data inserted thereinto or that the encrypted Y-series auxiliary data packet PYAE or the Y-series auxiliary data packet PYA has no error correction data inserted thereinto. When the control signal SWE indicates that the encrypted Y-series auxiliary data packet PYAE or the Y-series auxiliary data packet PYA has the error correction data inserted thereinto, the data selector 94 extracts the encrypted Y-series auxiliary data packet PYAE' or the Y-series auxiliary data packet PYA' supplied from the error corrector 92 and supplies the extracted encrypted Y-series auxiliary data packet PYAE' or Y-series auxiliary data packet PYA' to a decryption processor 81 and a delay device 82. When the control signal SWE indicates that the encrypted Y-series auxiliary data packet PYAE or the Y-series auxiliary data packet PYA has no error correction data inserted thereinto, the data selector 94 extracts the encrypted Y-series auxiliary data packet PYAE or the Y-series auxiliary data packet PYA supplied from the delay device 93 and supplies the extracted encrypted Y-series auxiliary data packet PYAE or Y-series auxiliary data packet PYA to the decryption processor 81 and the delay device 82.

The decryption processor 81 and the delay device 82 process the encrypted Y-series auxiliary data packet PYAE' or the Y-series auxiliary data packet PYA', or the encrypted Y-series auxiliary data packet PYAE or the Y-series auxiliary data packet PYA in the same manner as in the processing of the encrypted Y-series auxiliary data packet PYAE or the Y-series auxiliary data packet PYA by the decryption processor 81 and the delay device 82 in FIG. 13.

The packet-code-data detector 91 outputs the detection output signal SW and the data available period flag ETF, like the packet-code-data detector 83 in FIG. 13, and supplies the detection output signal SW to a data selector 86.

Other components and the operation in the example of the structure shown in FIG. 14 are similar to those in the example of the structure shown in FIG. 13. The Y-series auxiliary information data DYA is output from the data selector 86.

Another example of the structure of the $PP_B/P_R$-series auxiliary-information-data decrypting-extracting unit 71 is similar to the other example of the structure of the Y-series auxiliary-information-data decrypting-extracting unit 70 shown in FIG. 14. In the other example of the structure of the $P_B/P_R$-series auxiliary-information-data decrypting-extracting unit 71, the $P_B/P_R$-series auxiliary information data DCA is output from a data selector corresponding to the data selector 86 in FIG. 14.

Although the encrypted HD-SDI signal is transmitted in the above examples of the data transmission apparatus and the encrypted HD-SDI signal is received in the above examples of the data reception apparatus, the data transmission method and the data transmission apparatus according to the invention described in the claims of this application is not limitedly used in the transmission of the encrypted HD-SDI signal and the data reception method and the data reception apparatus according to the invention described in the claims of this application are not limitedly used in the reception of the encrypted HD-SDI signal. The data transmission method and the data transmission apparatus and the data reception method and the data reception apparatus, according to the invention described in the claims of this application, are applicable to the transmission and the reception of, for example, an encrypted high-definition-serial data transport interface (HD-SDTI) signal and an encrypted Ethernet® signal.

INDUSTRIAL APPLICABILITY

As described above, in the data transmission method according to the invention described in any of Claims 1 to 3 in the claims of this application or the data transmission apparatus according to the invention described in any of Claims 7 to 9 in the claims of this application, the encrypted information data including no inhibited codes is generated and the encrypted data packet including the encrypted information data is transmitted. Accordingly, in the generation of encrypted serial data based on the transmitted encrypted data packet, the encrypted serial data does not include a part in which undesired inhibited codes are converted into serial data.

The first combination of the plurality of inhibited codes forming the data flag included in the encrypted data packet is replaced with the second combination of the inhibited codes, different from the first combination. Accordingly, when the receiving apparatus receiving the transmitted encrypted data packet does not include decrypting means for the encrypted information data included in the encrypted data packet, the data flag is not detected and, therefore, the encrypted data packet is not received, so that reproduction of information data based on the encrypted information data included in the encrypted data packet is not performed. Consequently, when the receiving apparatus receiving the encrypted data packet has a speaker, serving as audio reproducing means for reproducing audio based on the reproduced digital audio information, but does not have the decrypting means for the encrypted information data included in the encrypted data packet, an undesirable audio signal formed based on the encrypted information data is not supplied to the speaker. As a result, a situation in which an excessive current based on the undesired audio signal is applied to the speaker to damage the speaker can be avoided.

In the data transmission method according to the invention described in Claim 2 or the data transmission apparatus according to the invention described in Claim 8, the error correction data for the encrypted information data is generated along with the encrypted information data and the encrypted information data and the error correction data corresponding to the encrypted information data are included in the encrypted data packet. Accordingly, a situation in which the encryption causes a reduction in performance of the error correction of the encrypted information data can be avoided.

In the data transmission method according to the invention described in Claim 3 or the data transmission apparatus according to the invention described in Claim 9, the data packet is included in each of the data sequences and the encrypted data packet based on the data packet is formed for every data sequence. Accordingly, even when a stream converter using an FIFO memory is used in the encryption in order to form an encrypted auxiliary data packet, a situation in which the writing period for the FIFO memory is not sufficiently provided to empty the FIFO memory does not arise. Consequently, a reduction in quality of the encryption security of the encrypted auxiliary data packet is not caused.

With the data transmission method according to the invention described in any of Claims 1 to 3 in the claims of this application or the data transmission apparatus according to the invention described in any of Claims 7 to 9 in the claims of this application, when the encrypted HD signal including the encrypted auxiliary data packet is formed and the encrypted HD-SDI signal based on the encrypted HD signal is transmitted, it is possible to selectively perform the encryption for every auxiliary data packet in each line of the Y data sequence and the $P_B/P_R$ data sequence forming the HD signal, thus improving the flexibility in the actual use.

Similarly, in the data transmission method according to the invention described in any of Claims 4 to 6 in the claims of this application or the data transmission apparatus according to the invention described in any of Claims 10 to 12 in the claims of this application, the encrypted information data including no inhibited codes is generated and the encrypted data packet including the encrypted information data is transmitted. Accordingly, in the generation of encrypted serial data based on the transmitted encrypted data packet, the encrypted serial data does not include a part in which undesired inhibited codes are converted into serial data.

The first code in the identification data representing a type of the encrypted information data is replaced with the second code that is other than the inhibited codes and that is different from the first code. Accordingly, when the receiving apparatus receiving the transmitted encrypted data packet does not include decrypting means for the encrypted information data included in the encrypted data packet, the type of the original information data represented by the identification data before the replacement is not recognized and, therefore, the data provided as the reproduced information data based on the encrypted information data included in the encrypted data packet is not processed as data belonging to the type of the original information data represented by the identification data before the replacement. Consequently, for example, when the receiving apparatus receiving the encrypted data packet has a speaker, serving as audio reproducing means for reproducing audio based on the reproduced digital audio information, but does not have the decrypting means for the encrypted information data included in the encrypted data packet, no signal based on the encrypted information data is supplied to the speaker and, therefore, an undesirable audio signal generated based on the encrypted information data is not supplied to the speaker. As a result, a situation in which an excessive current based on the undesired audio signal is applied to the speaker to damage the speaker can be avoided.

With the data transmission method according to the invention described in any of Claims 4 to 6 in the claims of this application or the data transmission apparatus according to the invention described in any of Claims 10 to 12 in the claims of this application, when the encrypted HD signal including the encrypted auxiliary data packet is formed and the encrypted HD-SDI signal based on the encrypted HD signal is transmitted, it is possible to selectively perform the encryption for every auxiliary data packet in each line of the Y data sequence and the $P_B/P_R$ data sequence forming the HD signal, thus improving the flexibility in the actual use.

In the data transmission method according to the invention described in any of Claims 1 to 6 in the claims of this application or the data transmission apparatus according to the invention described in any of Claims 7 to 12 in the claims of this application, it is possible to form the encrypted auxiliary data packet by the encryption of the auxiliary data packet formed of the auxiliary data included in the HD signal forming the HD-SDI signal, to generate the encrypted HD signal including the encrypted auxiliary data packet, and to transmit the encrypted HD-SDI signal based on the encrypted HD signal while selectively performing the encryption for every auxiliary data packet and avoiding the disadvantages involved in the application of proposed technologies described above.

In the data reception method according to the invention described in any of Claims 13 to 15 in the claims of this application or the data reception apparatus according to the invention described in any of Claims 19 to 21 in the claims of this application, the encrypted data packet that is transmitted, that includes the encrypted information data including no inhibited codes, and that has the data flag formed of the second combination of a plurality of inhibited codes, with which second combination of the inhibited codes the first combination of the inhibited codes is replaced, the second combination being different from the first combination, is received; the decryption is performed for the encrypted information data included in the encrypted data packet to generate the reproduced information data; the data flag included in the encrypted data packet is detected; and the reproduced information data is extracted in accordance with the detection output resulting from the detection.

In the above process, the encrypted information data included in the encrypted data packet includes no inhibited codes. Accordingly, in the generation of encrypted serial data based on the transmitted encrypted data packet, the encrypted serial data does not include a part in which undesired inhibited codes are converted into serial data. Consequently, the reception of the encrypted data packet that is transmitted and that includes the encrypted information data including no inhibited codes does not have the disadvantage in that undesired inhibited codes are detected and, therefore, the encrypted data packet is not received.

In addition, the decryption is performed for the encrypted information data including no inhibited codes, in the received encrypted data packet, to generate the reproduced information data. The data flag formed of the first combination of the inhibited codes is replaced with the second combination of the inhibited codes, the second combination being different from the first combination, is detected and a timing when the reproduced information data is generated is detected based on the detection output representing the reception of the encrypted data packet. At a timing detected based on the detection output representing the reception of the encrypted data packet, the reproduced information data resulting from the decryption performed for the encrypted information data is extracted. Accordingly, appropriate reproduced information data can be reproduced.

In the data reception method according to the invention described in any of Claims 16 to 18 in the claims of this application or the data reception apparatus according to the invention described in any of Claims 22 to 24 in the claims of this application, the encrypted data packet that is transmitted, that has the data flag formed of the inhibited codes, and that includes the encrypted information data including no inhibited codes, the data flag being followed by the identification data that has the second code other than the inhibited codes, with which second code the first code is replaced, the second code being different from the first code, is received; the decryption is performed for the encrypted information data included in the encrypted data packet to generate the reproduced information data; the identification data included in the encrypted data packet is detected; and the reproduced information data is extracted in accordance with the detection output resulting from the detection.

In the above process, the encrypted information data included in the encrypted data packet includes no inhibited codes. Accordingly, in the generation of encrypted serial data based on the transmitted encrypted data packet, the encrypted serial data does not include a part in which undesired inhibited codes are converted into serial data. Consequently, the reception of the encrypted data packet that is transmitted and that includes the encrypted information data including no inhibited codes does not have the disadvantage in that undesired inhibited codes are detected and, therefore, the encrypted data packet is not received.

In addition, the decryption is performed for the encrypted information data including no inhibited codes, in the received encrypted data packet, to generate the reproduced information data. The identification data having the second code other than the inhibited codes, different from the original first code, with which second code the first code is replaced, is detected and a timing when the reproduced information data is generated is detected based on the detection output representing the timing corresponding to the position of the identification data in the encrypted data packet. At the detected timing, the reproduced information data resulting from the decryption performed for the encrypted information data is extracted. Accordingly, appropriate reproduced information data can be reproduced.

The invention claimed is:

1. A data transmission method comprising the steps of:
performing encryption for information data included in a data packet having a data flag formed of a first combination of a plurality of inhibited codes that are not used as information codes representing information, the information data being formed without using the inhibited codes, so as not to generate the inhibited codes in order to generate encrypted information data that includes no inhibited codes;
replacing the first combination of the plurality of inhibited codes in the data flag in the data packet with a second combination of the inhibited codes, the second combination being different from the first combination, to form an encrypted data packet that has the replaced data flag and that includes the encrypted information data; and
transmitting the encrypted data packet,
wherein when the transmitted encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

2. The data transmission method according to claim 1, wherein error correction data for the encrypted information data is generated along with the encrypted information data, and
wherein the error correction data is incorporated in the encrypted data packet.

3. The data transmission method according to claim 1, wherein the data packet is included in each of a plurality of data sequences, and wherein the encrypted data packet based on the data packet is formed for every data sequence.

4. A data transmission method comprising the steps of:
performing encryption for information data included in a data packet having a data flag formed of a predetermined combination of a plurality of inhibited codes that are not used as information codes representing information, the information data being formed without using the inhibited codes, the data flag being followed by identification data that includes a first code other than the inhibited codes to represent a type of the information data, so as not to generate the inhibited codes in order to generate encrypted information data that includes no inhibited codes;
replacing the first code included in the identification data in the data packet with a second code that is different from the first code and that is other than the inhibited codes to form an encrypted data packet that has the data flag followed by the replaced identification data and that includes the encrypted information data; and
transmitting the encrypted data packet,
wherein when the transmitted encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

5. The data transmission method according to claim 4, wherein error correction data for the encrypted information data is generated along with the encrypted information data, and wherein the error correction data is incorporated in the encrypted data packet.

6. The data transmission method according to claim 4, wherein the data packet is included in each of a plurality of data sequences, and wherein the encrypted data packet based on the data packet is formed for every data sequence.

7. A data transmission apparatus comprising:
an encryption processing unit configured to perform encryption for information data included in a data packet having a data flag formed of a first combination of a plurality of inhibited codes that are not used as information codes representing information, the information data being formed without using the inhibited codes, so as not to generate the inhibited codes in order to generate encrypted information data that includes no inhibited codes;
an encrypted-data-packet forming unit configured to replace the first combination of the plurality of inhibited codes in the data flag in the data packet with a second combination of the inhibited codes, the second combination being different from the first combination, to form an encrypted data packet that has the replaced data flag and that includes the encrypted information data generated by the encryption processing unit; and
a data transmitting unit configured to transmit the encrypted data packet formed by the encrypted-data-packet forming unit,
wherein when the transmitted encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

8. The data transmission apparatus according to claim 7, wherein the encryption processing unit generates error correction data for the encrypted information data along with the generation of the encrypted information data, and
wherein the encrypted-data-packet forming unit incorporates the error correction data generated by the encryption processing unit in the encrypted data packet.

9. The data transmission apparatus according to claim 7, wherein the data packet is included in each of a plurality of data sequences, and
wherein a plurality of combinations of the encryption processing unit and the encrypted-data-packet forming unit is provided corresponding to the plurality of data sequences.

10. A data transmission apparatus comprising:
an encryption processing unit configured to perform encryption for information data included in a data packet having a data flag formed of a predetermined combination of a plurality of inhibited codes that are not used as information codes representing information, the information data being formed without using the reserved codes, the data flag being followed by identification data that includes a first code other than the reserved codes to represent a type of the information data, so as not to generate the inhibited codes in order to generate encrypted information data that does not use the inhibited codes;

an encrypted-data-packet forming unit configured to replace the first code included in the identification data in the data packet with a second code that is different from the first code and that is other than the reserved codes to form an encrypted data packet that has the data flag followed by the replaced identification data and that includes the encrypted information data generated by the encryption processing unit; and a data transmitting unit configured to transmit the encrypted data packet formed by the encrypted-data-packet forming unit, wherein when the transmitted encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

11. The data transmission apparatus according to claim 10, wherein the encryption processing unit generates error correction data for the encrypted information data along with the generation of the encrypted information data, and wherein the encrypted-data-packet forming unit incorporates the error correction data generated by the encryption processing unit in the encrypted data packet.

12. The data transmission apparatus according to claim 10, wherein the data packet is included in each of a plurality of data sequences, and wherein a plurality of combinations of the encryption processing unit and the encrypted-data-packet forming unit is provided corresponding to the plurality of data sequences.

13. A data reception method comprising the steps of:
receiving encrypted data packet that is transmitted and that has a data flag formed of a second combination of a plurality of inhibited codes that are not used as information codes representing information, with which second combination of the inhibited codes a first combination of the inhibited codes is replaced, the second combination being different from the first combination, the encrypted data packet including encrypted information data that includes no reserved codes and that results from encryption performed for information data formed without using the inhibited codes so as not to generate the inhibited codes;

performing decryption for the encrypted information data included in the encrypted data packet to generate reproduced information data;

detecting the data flag included in the encrypted data packet; and extracting the reproduced information data in accordance with a detection output resulting from the detection, wherein when the received encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

14. The data reception method according to claim 13, wherein the encrypted data packet has the data flag and includes error correction data for the encrypted information data along with the encrypted information data, and wherein the error correction data included in the encrypted data packet is received to perform error correction for the encrypted information data by using the error correction data and the decryption is performed for the encrypted information data subjected to the error correction to generate the reproduced information data.

15. The data reception method according to claim 13, wherein the encrypted data packet is included in each of a plurality of data sequences, and wherein, for every data sequence, the decryption is performed for the encrypted information data included in the encrypted data packet, the data flag included in the encrypted data packet is detected, and the reproduced information data is extracted.

16. A data reception method comprising the steps of:
receiving encrypted data packet that is transmitted, that has a data flag formed of a predetermined combination of a plurality of inhibited codes that are not used as information codes representing information, and that includes encrypted information data resulting from encryption performed for information data formed without using the inhibited codes so as not to generate the inhibited codes and including no reserved codes, the data flag being followed by identification data that has a second code other than the inhibited codes, with which second code a first code that is other than the inhibited codes and that represents a type of the information data is replaced, the second code being different from the first code;

performing decryption for the encrypted information data included in the encrypted data packet to generate reproduced information data; detecting the identification data included in the encrypted data packet; and extracting the reproduced information data in accordance with a detection output resulting from the detection, wherein when the received encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

17. The data reception method according to claim 16, wherein the encrypted data packet has the data flag followed by the identification data and includes error correction data for the encrypted information data along with the encrypted information data, and wherein the error correction data included in the encrypted data packet is received to perform error correction for the encrypted information data by using the error correction data and the decryption is performed for the encrypted information data subjected to the error correction to generate the reproduced information data.

18. The data reception method according to claim 16,
wherein the encrypted data packet is included in each of a plurality of data sequences, and
wherein, for every data sequence, the decryption is performed for the encrypted information data included in the encrypted data packet, the identification data included in the encrypted data packet is detected, and the reproduced information data extracted.

19. A data reception apparatus comprising:
a data-sequence reproducing unit configured to receive encrypted data packet that is transmitted and that has a data flag formed of a second combination of a plurality of inhibited codes that are not used as information codes representing information, with which second combination of the inhibited codes a first combination of the inhibited codes is replaced, the second combination being different from the first combination, the encrypted data packet including encrypted information data that includes no inhibited codes and that results from encryption performed for information data formed without using the inhibited codes so as not to generate the inhibited codes;
a decryption processing unit configured to perform decryption for the encrypted information data included in the encrypted data packet received by the data-sequence reproducing unit to generate reproduced information data;
a data detecting unit configured to detect the data flag included in the encrypted data packet; and
a data selecting unit configured to extract the reproduced information data generated by the decryption processing unit in accordance with a detection output supplied from the data detecting unit,
wherein when the received encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

20. The data reception apparatus according to claim 19,
wherein the encrypted data packet has the data flag and includes error correction data for the encrypted information data along with the encrypted information data, and
wherein the decryption processing unit receives the error correction data included in the encrypted data packet to perform error correction for the encrypted information data by using the error correction data and the decryption is performed for the encrypted information data subjected to the error correction to generate the reproduced information data.

21. The data reception apparatus according to claim 19,
wherein the encrypted data packet is included in each of a plurality of data sequences, and wherein a plurality of combinations of the decryption processing unit, the data detecting unit, and the data selecting unit is provided corresponding to the plurality of data sequences.

22. A data reception apparatus comprising:
a data-sequence reproducing unit configured to receive encrypted data packet that is transmitted, that has a data flag formed of a predetermined combination of a plurality of inhibited codes that are not used as information codes representing information, and that includes encrypted information data resulting from encryption performed for information data formed without using the inhibited codes so as not to generate the inhibited codes and including no inhibited codes, the data flag being followed by identification data that has a second code other than the inhibited codes, with which second code a first code that is other than the inhibited codes and that represents a type of the information data is replaced, the second code being different from the first code;
a decryption processing unit configured to perform decryption for the encrypted information data included in the encrypted data packet received by the data-sequence reproducing unit to generate reproduced information data;
a data detecting unit configured to detect the identification data included in the encrypted data packet; and
a data selecting unit configured to extract the reproduced information data generated by the decryption processing unit in accordance with a detection output supplied from the data detecting unit,
wherein when the received encrypted data packet does not include decrypting information, a type of original information data represented by identification data before the replacing is not recognized and reproduced information data based on encrypted information data included in the encrypted data packet is not processed as data belonging to a same type of information as the information data represented by identification data before the replacement of the first combination with the second combination.

23. The data reception apparatus according to claim 22,
wherein the encrypted data packet has the data flag followed by the identification data and includes error correction data for the encrypted information data along with the encrypted information data, and
wherein the decryption processing unit receives the error correction data included in the encrypted data packet to perform error correction for the encrypted information data by using the error correction data and the decryption is performed for the encrypted information data subjected to the error correction to generate the reproduced information data.

24. The data reception apparatus according to claim 19,
wherein the encrypted data packet is included in each of a plurality of data sequences, and
wherein a plurality of combinations of the decryption processing unit, the data detecting unit, and the data selecting unit is provided corresponding to the plurality of data sequences.

* * * * *